US006625004B1

(12) United States Patent
Musolf et al.

(10) Patent No.: US 6,625,004 B1
(45) Date of Patent: Sep. 23, 2003

(54) ELECTROSTATIC ACTUATORS WITH INTRINSIC STRESS GRADIENT

(75) Inventors: Jurgen Musolf, Santa Barbara, CA (US); Paul Kohl, Atlanta, GA (US)

(73) Assignee: Superconductor Technologies, Inc., Santa Barbara, CA (US)

( * ) Notice: Subject to any disclaimer, the term of this patent is extended or adjusted under 35 U.S.C. 154(b) by 0 days.

(21) Appl. No.: 09/944,867

(22) Filed: Aug. 31, 2001

(51) Int. Cl.$^7$ .................................................. H01G 5/01
(52) U.S. Cl. .................... 361/278; 361/277; 361/298.2; 361/281; 361/282; 439/81
(58) Field of Search ................................. 361/277, 278, 361/279, 281, 282, 299.5, 298.2, 298.4, 298.5, 290, 772, 774; 439/81

(56) References Cited

U.S. PATENT DOCUMENTS

| | | | |
|---|---|---|---|
| 5,476,836 A | | 12/1995 | Eddy |
| 5,508,255 A | | 4/1996 | Eddy |
| 5,613,861 A | * | 3/1997 | Smith et al. |
| 5,843,870 A | | 12/1998 | Wu et al. |
| 5,883,050 A | | 3/1999 | Yun et al. |
| 6,229,684 B1 | * | 5/2001 | Cowen et al. |
| 6,361,331 B2 | * | 3/2002 | Fork et al. |
| 6,396,677 B1 | * | 5/2002 | Chua et al. |

OTHER PUBLICATIONS

Angerer, H. et al., On the Electrodeposition of Hard Gold, Journal of Applied Electrochemistry, 9 (1979), pp 219–232.
Chinthakindi, A.K. et al., Stress Temperature Studies of Au/Al and Au/Zn Bimetallic Films, in press.
Chu, W. et al., Low Stress Gold Electroplating for X–Ray Masks, Microelectronic Engineering, 17 (1992), pp 223–226.
Dec, A. et al., Micromachined Electro–mechanically Tunable Capacitors and Their Applications to RF IC's, IEEE Transactions of Microwave Theory and Techniques, vol. 46, No. 12, Dec., 1998.
Fang, W., et al., Determining Mean and Gradient Residual Stresses in Thin Films Using Micromachined Cantilevers, J. Micormech. Microeng. 6 (1996), pp 301–309.
Hodge, T.C. et al., Stresses in Thin Film Metallization, IEEE Transactions on Components, Packaging and Manufacturing Technology, Part A, vol. 20, No. 2, Jun., 1997.
Hoffman, M. et al., Bistable Micromechanical Fiber–Optic Switches on Silicon with Thermal Actuators, Sensors and Actuators, 78 (1999), pp 28–35.
Kohl, P. A. Electrodeposition of Gold, Modern Electroplating, 4$^{th}$ Ed., 2000, pp 201–225.
Laibinis, P.E., et al., Comparison of the Structures and Wetting Properties of Self–Assembled Monolayers of N–Alkanethiols of the Coinage Metal Surfaces, Cu Ag, Au, J. Am. Chem. Soc., 1991, 113, pp 7152–7167.

(List continued on next page.)

*Primary Examiner*—Dean A. Reichard
*Assistant Examiner*—Nguyen Ha
(74) *Attorney, Agent, or Firm*—O'Melveny & Myers LLP

(57) ABSTRACT

An electrostatic actuator with an intrinsic stress gradient is provided. The electrostatic actuator comprises an electrode and an electrostatically actuated beam fixed at one end relative to the electrode. The electrostatically actuated beam further includes a metal layer made substantially of a single metal with an induced stress gradient therein. The stress gradient in the metal layer determines the initial curvature of the beam. Upon electrostatic actuation of the beam, the beam is deflected from its initial curvature relative to the electrode. In one embodiment, the electrostatically actuated beam is used as a top movable electrode of an electrostatically actuated variable capacitor. The capacitance of the electrostatically actuated capacitor is changed upon electrostatic actuation of the beam.

16 Claims, 15 Drawing Sheets

OTHER PUBLICATIONS

Legtenberg, R. et al., Electrostatic Curved Electrode Actuators, Journal of Microelectromechanical Systems, vol. 6, No. 3, Sep. 1997.

Lo, C.C., et al., Hardening Mechanisms of Hard Gold, J. Appl. Phys. 50(11), Nov., 1979.

Maboudian, R. et al., Self Assembled Monolayers as Anti-Stiction Coatings for MEMS: Characteristics and Recent Development, Sensors and Actuators 82 (2000), pp 219–223.

Maboudian, R., Critical Review: Adhesion in Surface Micromechanical Structures, J.Vac.Sci. Technol. B 15(1), Jan./Feb. 1997, pp 1–20.

Maeda, H. et al., A New High–Tc Oxide Superconductor Without a Rare Earth Element, Jpn. J. Appl. Phys. 27, L209 (1988).

Min, Y. et al., Modeling, Design, Fabrication and Measurement of a Single Layer Polysilicon Micromirror with Initial Curvature Compensation, Sensors and Actuators, 78 (1999), pp 8–17.

Min, Y.H. et al., In Situ Measurement of Residual Stress in Micromachined Thin Films Using a Specimen with Composite–Layered Cantilevers, J. Micromech, Microeng. 10 (2000), pp 314–321.

Nguyen, C.T.C., Micromechanical Resonators for Oscillators and Filters, Proc. IEEE Ultrasonics Symp., Seattle, WA, Nov., 1995, vol. pp 489–499.

Roas, B. et al., Epitaxial Growth of Yba2Cu2O7–x Thin Films by a Laser Evaporation Process, Appl. Phys. Lett. 53, 1557 (1988).

Timoshenko, S., Analysis of Bi–Metal Thermostats, Journal of Structural Analysis and RSI, Sep., 1925.

Zook, J.D. et al., Characteristics of Polysilicon Resonant Microbeams, Sensors and Actuators A, vol. A35, No. 1, pp 51–59, Oct., 1992.

* cited by examiner

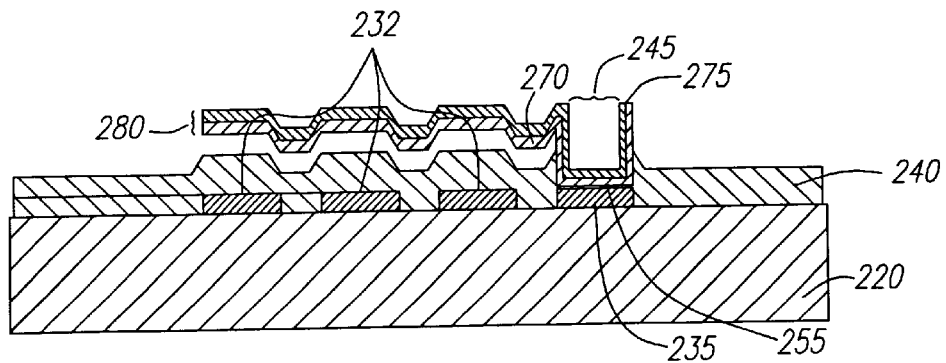
FIG. 3J
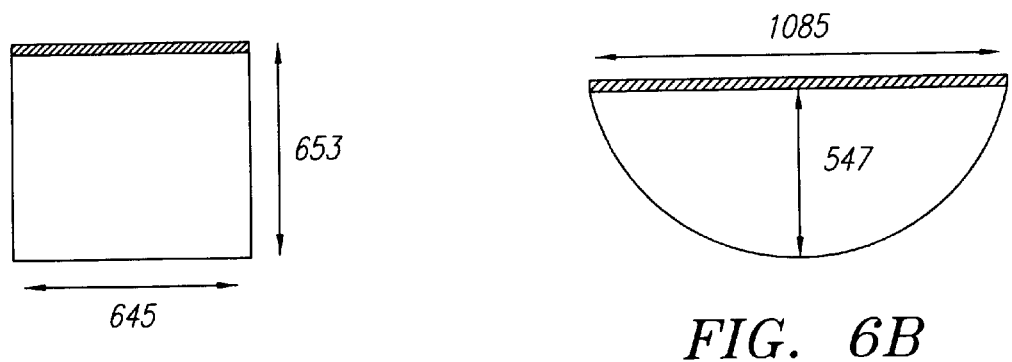
FIG. 6A
FIG. 6B
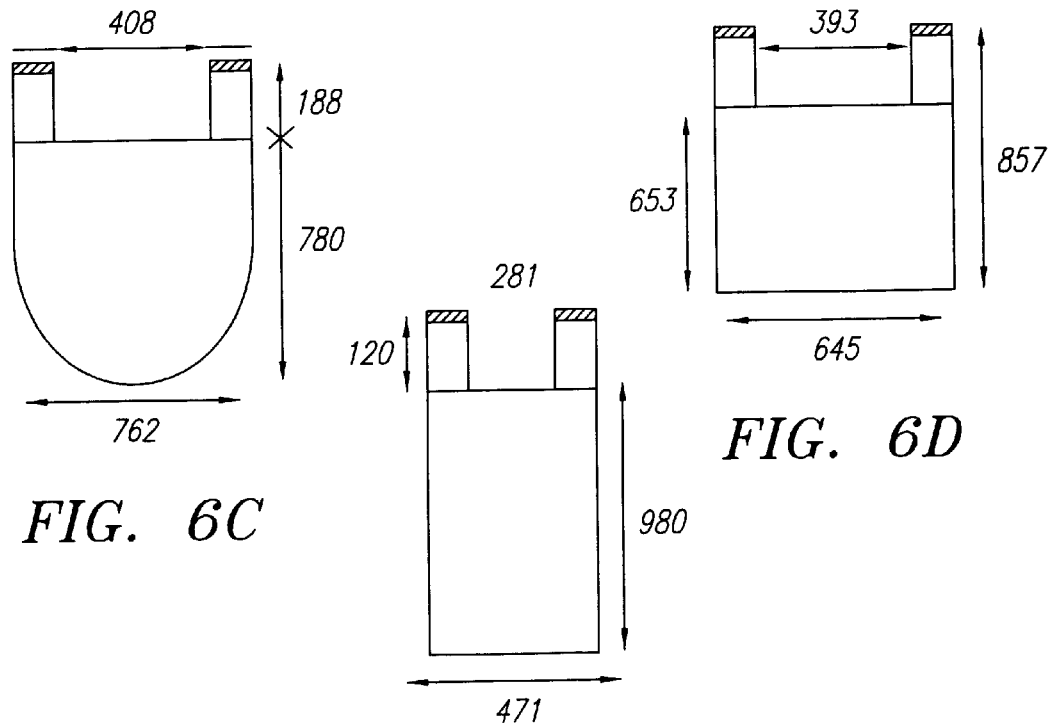
FIG. 6C
FIG. 6D
FIG. 6E

ELECTROSTATIC ACTUATORS WITH INTRINSIC STRESS GRADIENT

The U.S. Government has a paid-up license in this invention and the right in limited circumstances to require the patent owner to license others on reasonable terms as provided for by the terms of DARPA contract MDA972-00-C-0010.

TECHNICAL FIELD

The invention relates to electrostatic actuators, and more particularly, to electrostatic actuators with intrinsic stress gradient.

BACKGROUND OF THE INVENTION

Electrostatically actuated beams are one of the fundamental building blocks in Micro-Electro-Mechanical System (MEMS) devices, and find applications in a variety of fields, such as communications, sensing, optics, micro-fluidics, and measurement of materials properties. In the field of communications, electrostatically actuated MEMS variable capacitors and RF switches are used in tunable RF filter circuits. The electrostatically actuated MEMS capacitors and RF switches offer several advantages over solid state varactor diodes, including a more linear response and a higher quality (Q) factor. For example, MEMS-tuned High Temperature Superconductor (HTS) resonators employing electrostatically actuated capacitors have demonstrated a frequency tuning range of about 7.5% with a Q factor above 2000 at a frequency of 850 MHz and a temperature of 77° K.

A conventional electrostatically actuated MEMS capacitor comprises a fixed bottom electrode on a substrate, and a flexible cantilever beam that acts as a top movable electrode of the capacitor. The cantilever beam is secured at one end to the substrate by a rigid anchor. The capacitance of the electrostatically actuated capacitor is changed by applying a bias voltage to the capacitor. The applied voltage establishes an electrostatic force on the beam that deflects the cantilever beam, thereby changing the inter-electrode gap between the top electrode (cantilever beam) and the bottom electrode, which in turn changes the capacitance. Therefore, the change in the inter-electrode gap of the capacitor upon electrostatic actuation of the cantilever beam changes the capacitance of the capacitor. The initial position of the cantilever beam with no applied bias voltage establishes the low (or off) capacitance of the capacitor. A curved cantilever beam allows for a lower capacitance in the off state (as compared to a straight one), which is desirable for many applications. A common approach for setting the initial curvature (with no applied bias) of the cantilever beam is to construct the beam using a layered stack of two metals with different Coefficients of Thermal Expansion (CTE). A beam constructed from two metals is often referred to as a bimetallic beam. The CTE mismatch between the two metals in the bimetallic beam produces a stress gradient in the beam that causes the beam to curve as the temperature is changed. In order to achieve an initial upward curvature of the bimetallic beam at cryo-temperatures, the metal with the higher CTE (e.g., aluminum) is deposited on top of the metal with the lower CTE (e.g., gold).

Although the usefulness of conventional electrostatically actuated devices has been demonstrated, there are a number of problems with these devices stemming from the use of the bimetallic beam. The mechanical properties of the bimetallic beam have been shown to change with time due to inter-metallic diffusion between the two metals and recrystallization, thereby limiting the long term reliability and reproducibility of these devices. The introduction of a diffusion barrier layer between the two metal layers can help reduce inter-metallic diffusion but can not solve it completely. Furthermore, the operation of these devices requires precise temperature control because any variation in temperature leads to a change in the deflection of the bimetallic beam, which in turn changes the capacitance of these devices.

Ideally the two metals used to construct the bimetallic beam are ductile, resistant to fatigue or work hardening, electrical conductive, and easy to process. However, the requirement that the two metals have different CTEs in order to achieve a desired initial curvature restricts the types of metal that are available to construct the bimetallic beam. Typically, a less than ideal metal (e.g., indium, aluminum or zinc) has to be used for one of the two metals of the bimetallic beam in order to achieve a desired initial curvature. As a result, the mechanical and electrical properties of the cantilever beam are compromised.

SUMMARY OF THE INVENTION

The present invention provides an electrostatic actuator with intrinsic stress gradient. The electrostatic actuator according to the invention uses a metal layer made substantially of a single metal with an intrinsic stress gradient induced therein instead of a bimetallic beam.

An electrostatic actuator, built in accordance with an embodiment of the invention, comprises an electrode and an electrostatically actuated beam fixed at one end relative to the electrode. The electrostatically actuated beam comprises a metal layer made substantially of a single metal with a stress gradient induced therein. The stress gradient in the metal layer causes the beam to curve away from the electrode. Upon electrostatic actuation of the beam, the beam is deflected from its initial position relative to the electrode.

An electrostatically actuated variable capacitor, built in accordance with another embodiment of the invention, comprises a substrate, a bottom electrode on the substrate, a curved cantilever beam acting as a top movable electrode of the capacitor, and a rigid anchor for securing one end of the cantilever beam to the substrate. The cantilever beam comprises a metal layer made substantially of a single metal with a stress gradient induced therein. The stress gradient in the metal layer causes the beam to initially curve upwardly from the substrate. Upon electrostatic actuation of the beam, the beam is deflected from its initial curvature relative to the bottom electrode, thereby changing the intro-electrode gap between the top electrode (cantilever beam) and the bottom electrode and the capacitance of the capacitor.

In one embodiment of the invention, the stress gradient is induced in the metal layer of the beam by varying process conditions during deposition of the metal layer.

In another embodiment of the invention, the metal layer is deposited using electroplating. In this embodiment, the stress gradient is induced in the metal layer of the beam by varying the electroplating bath, current density, and/or temperature during electroplate deposition of the metal layer.

In another embodiment, the metal layer is deposited in a two step deposition process of a soft metal deposition followed by a hard metal deposition, where the deposited hard metal exhibits higher intrinsic stress than the soft metal. The soft and hard metal are both made of the same metal, e.g., gold, characterized by different crystal grain sizes. In one embodiment, the electroplating bath used to deposit the hard metal contains dopants to enhance the intrinsic stress in the hard metal.

In another embodiment of the invention, the metal layer is deposited using evaporation, such as electron beam evaporation. In this embodiment, the stress gradient is induced in the metal layer by varying the deposition rate during deposition of the metal layer. In one embodiment, an initial upward curvature of the beam is obtained by increasing the deposition rate during deposition of the metal layer.

In another embodiment of the invention, the metal layer is deposited using sputtering. In this embodiment, the stress gradient is induced in the metal layer by varying the gas pressure of the sputtering during deposition of the metal layer. In one embodiment, an initial upward curvature of the beam is obtained by increasing the gas pressure of the sputtering during deposition of the metal layer.

In another embodiment of the invention, the cantilever beam is fully hinged to the anchor at one end.

In another embodiment of the invention, the cantilever beam is double hinged to the anchor at one end.

In another embodiment of the invention, the front edge of the cantilever beam is straight.

In another embodiment of the invention, the front edge of the beam is curved to alleviate stress concentration due to sharp corners.

Other objects and features of the present invention will become apparent from consideration of the following description taken in conjunction with the accompanying drawings.

BRIEF DESCRIPTION OF THE DRAWINGS

FIG. 6 is a top view of five cantilever beams built in accordance with the invention.

DETAILED DESCRIPTION OF THE PREFERRED EMBODIMENTS

The present invention is believed to be applicable to a variety of electrostatic actuators requiring electrostatically actuated beams. The present invention is particularly applicable to electrostatically actuated variable capacitors. While the present invention is not so limited, an appreciation of the present invention is best presented by way of a particular example application, in this instance, in the context of such electrostatically actuated variable capacitors.

Figure 1:
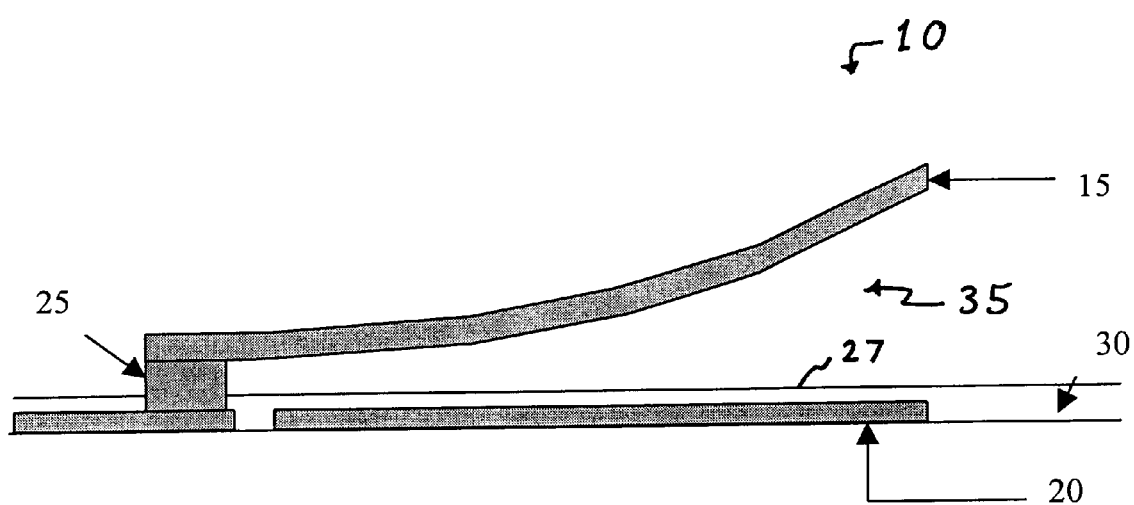
FIG. 1 is a cross-sectional view of an electrostatically actuated capacitor according to an embodiment of the invention.
Figure 2A:
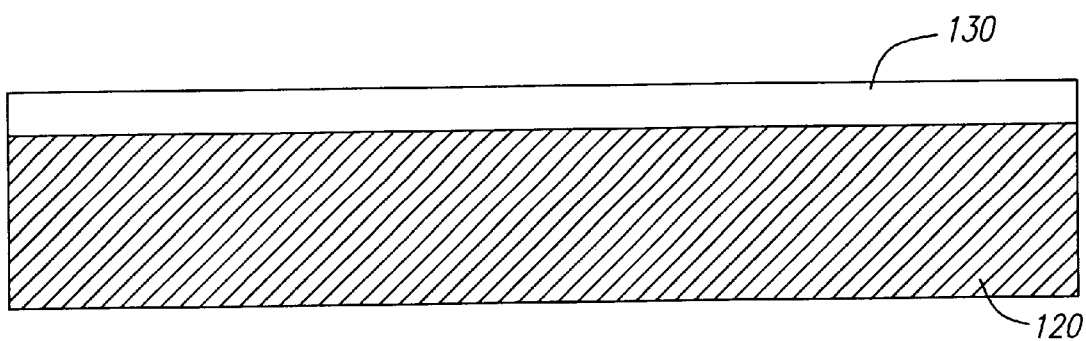
FIG. 2 is a process sequence for fabricating an electrostatically actuated capacitor according to an embodiment of the invention.
Figure 2B:
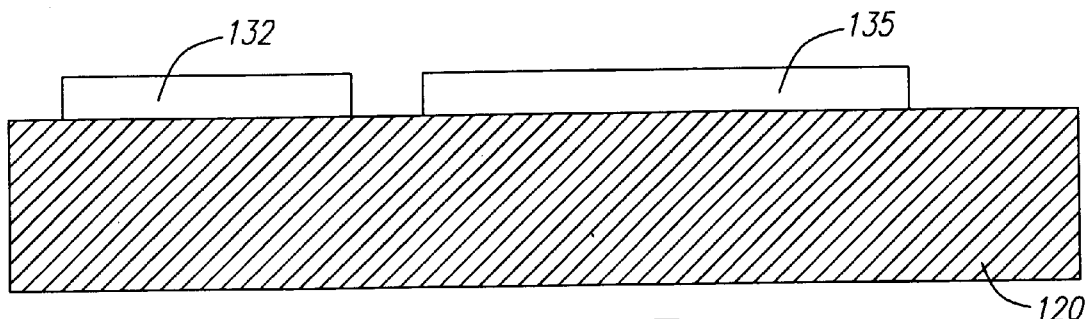
Figure 2C:
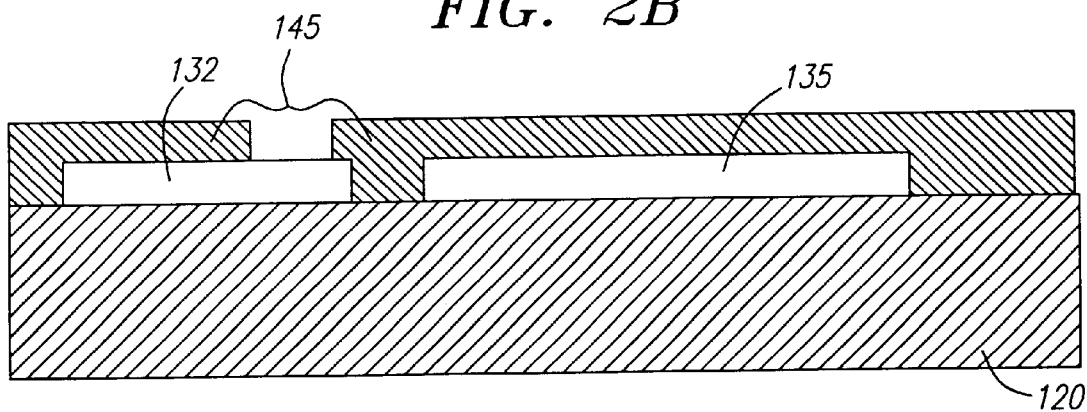
Figure 2D:
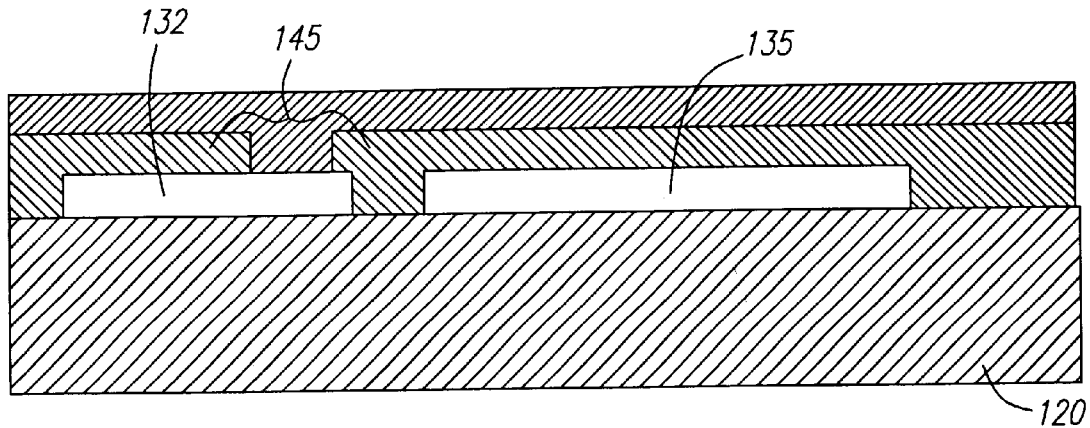
Figure 2E:
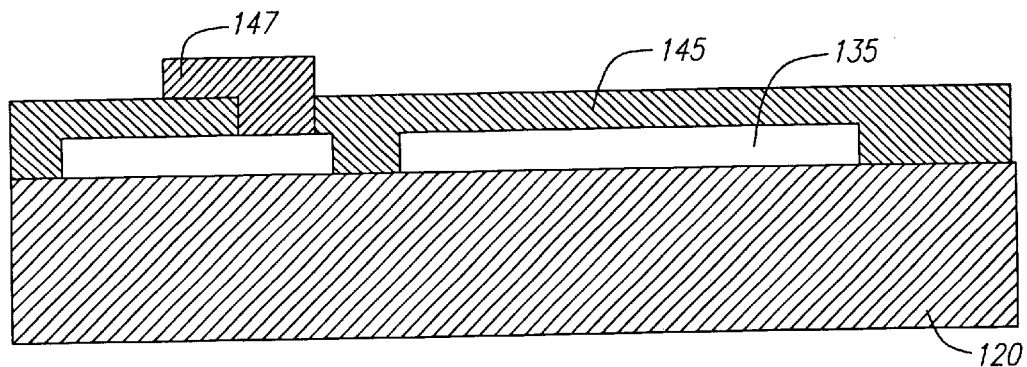
Figure 2F:
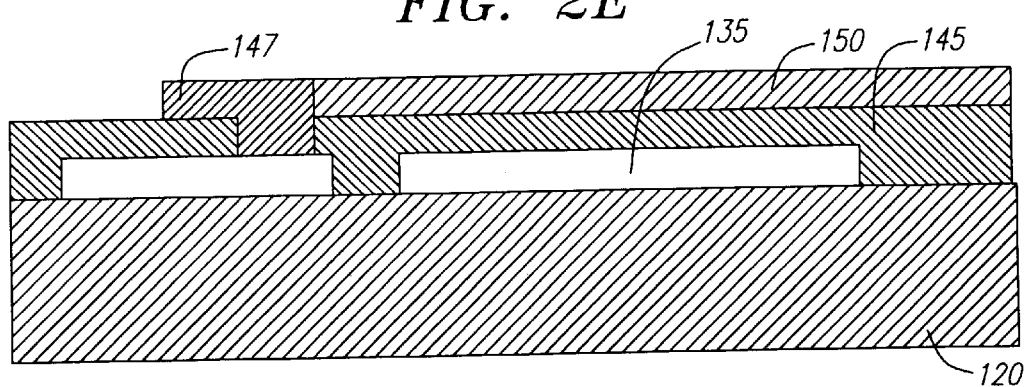
Figure 2G:
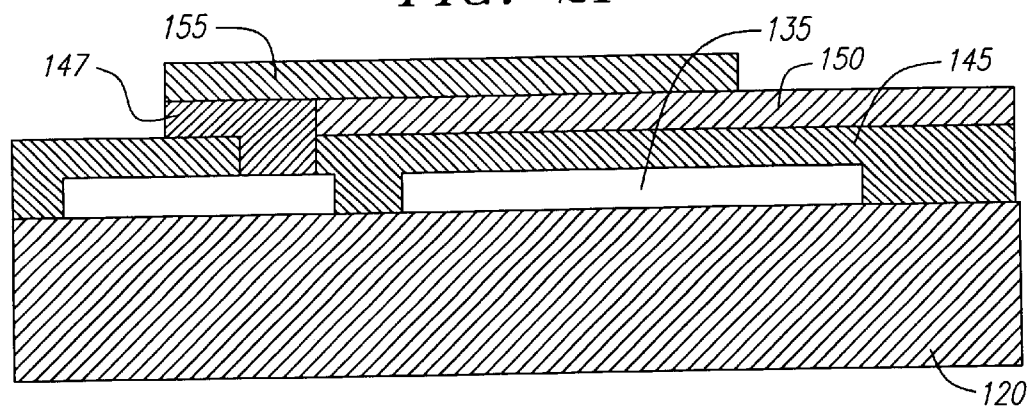
Figure 2H:
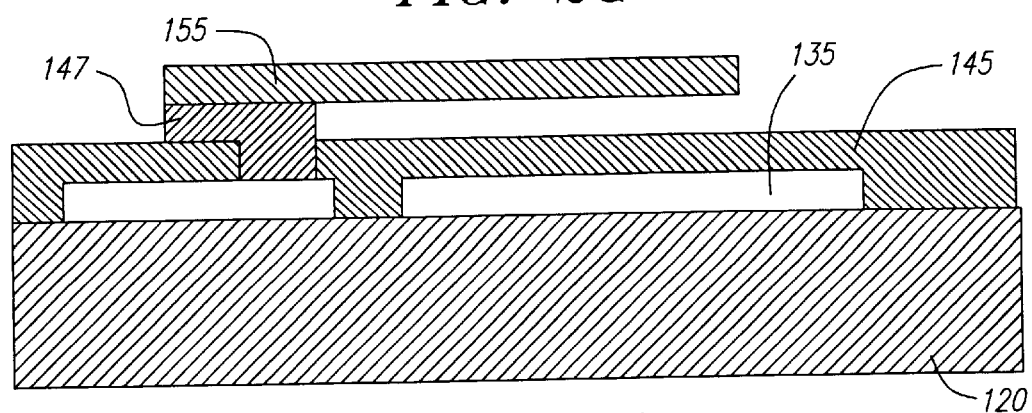
Figure 3A:
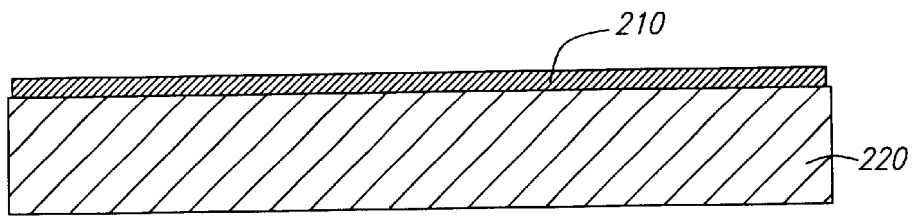
FIG. 3 is a process sequence for fabricating an electrostatically actuated capacitor according to another embodiment of the invention.
Figure 3B:
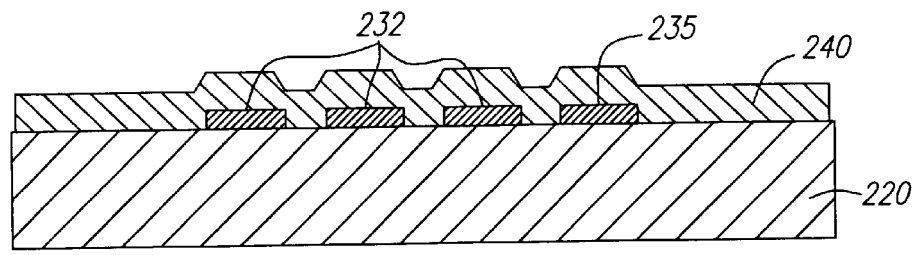
Figure 3C:
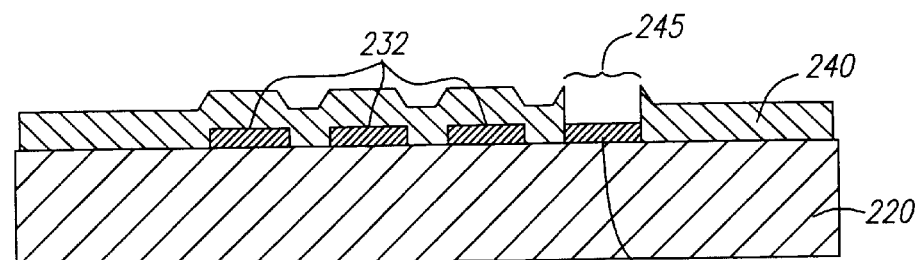
Figure 3D:
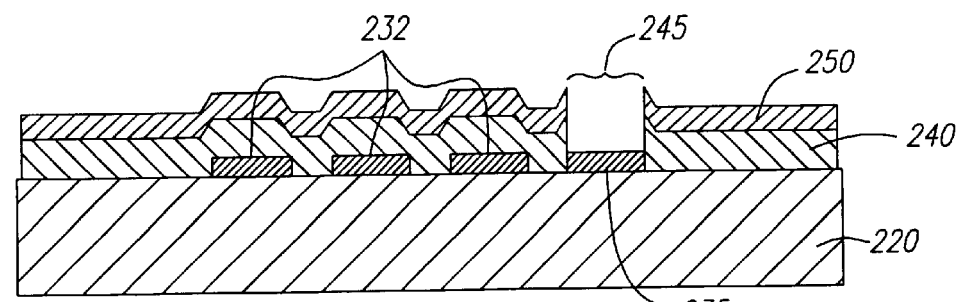
Figure 3E:
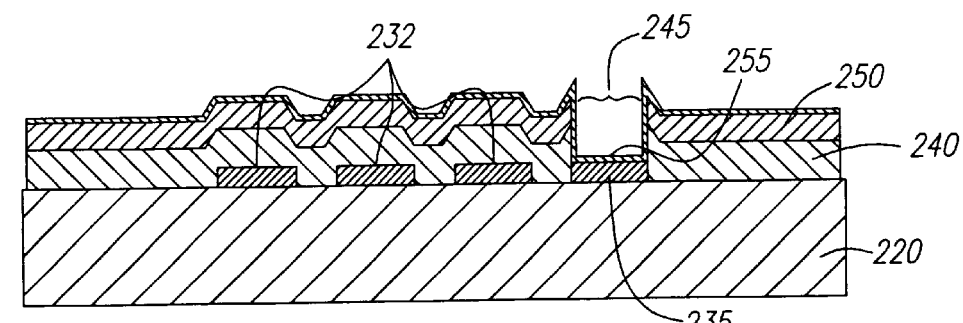
Figure 3F:
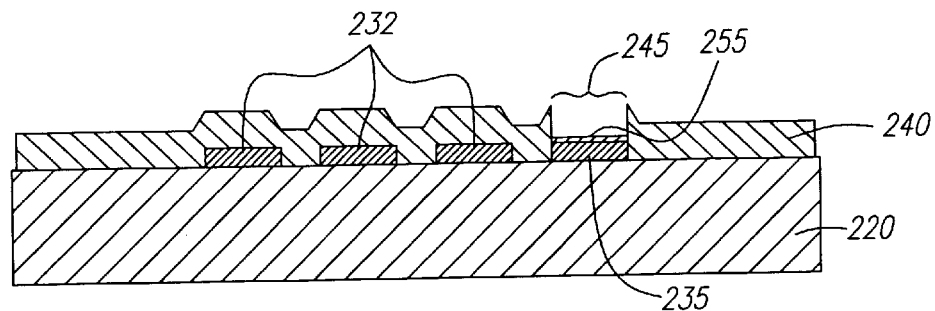
Figure 3G:
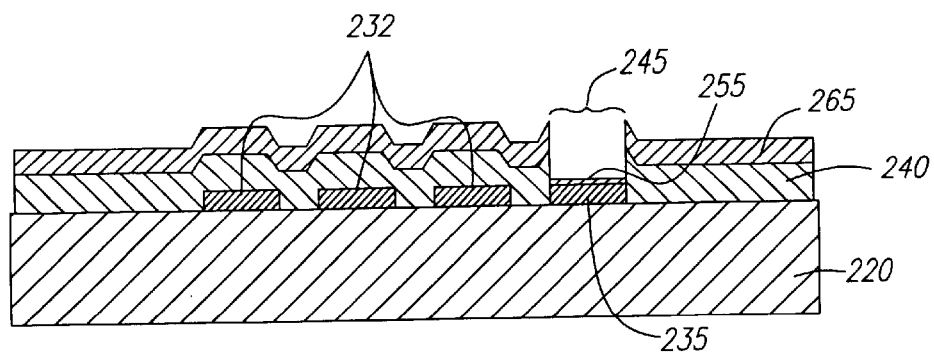
Figure 3H:
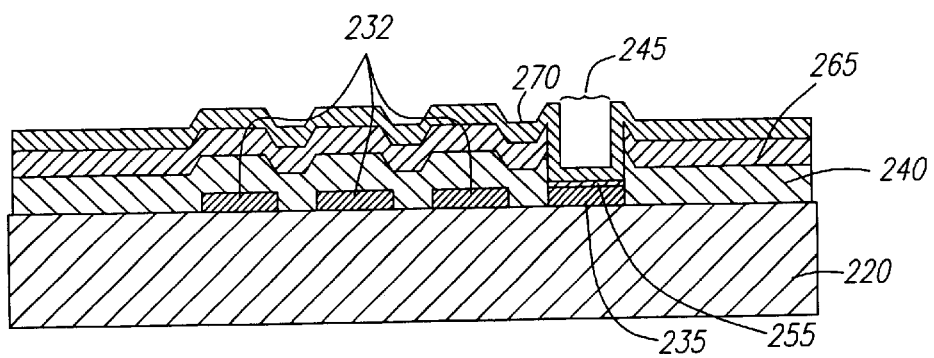
Figure 3I:
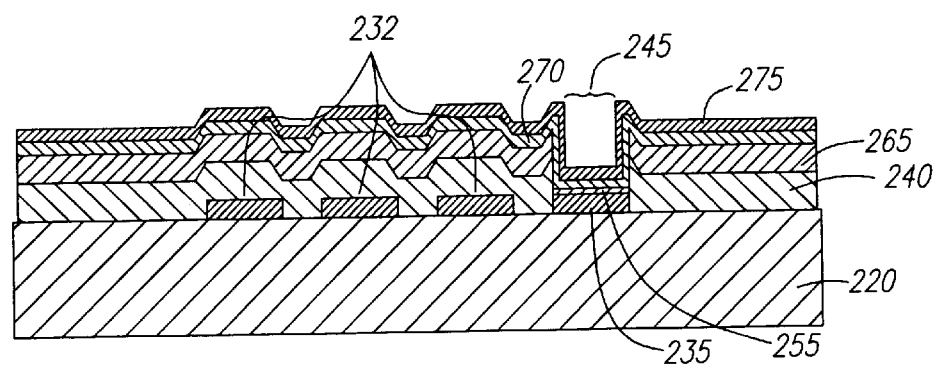

Turning to the drawings, FIG. 1 shows a cross section of an electrostatically actuated capacitor 10 according to an embodiment of the invention. The capacitor 10 comprises a base substrate 30, a bottom electrode 20 on the substrate 30 and a curved cantilever beam 15, which act as a top movable electrode of the capacitor 10. The cantilever beam 15 according to the invention comprises a metal layer with an intrinsic stress gradient induced therein. The metal layer is substantially made of a single metal. The stress gradient in the metal layer produces an initial upward curvature in the cantilever beam 15. The stress gradient is induced in the metal layer of the beam 15 by varying process conditions during deposition of the metal layer. A more detailed discussion will follow. The capacitor 10 further comprises a rigid anchor 25 for securing one end of the cantilever beam 15 to the substrate 30. The rigid anchor 25 may be made of the same material as the beam 15. The capacitor 10 also includes an optional dielectric layer 27 deposited over the bottom electrode 20. Preferably, the metal layer of the cantilever beam 15 is made of a metal characterized by high electrical conductivity, low loss, ease of deposition, and excellent flexibility. Suitable metals for the metal layer include gold and silver. The bottom electrode 20 may be made of aluminum on, e.g., a silicon substrate. Alternatively, the bottom electrode 20 may be made of a thin-film High Temperature Superconductor (HTS) material on, e.g., a MgO substrate. Thin-film HTS materials are now routinely formed and are commercially available. See, e.g., U.S. Pat. Nos. 5,476,836, 5,508,255, 5,843,870, and 5,883,050. Also see, e.g., B. Roas, L. Schultz, and G. Endres, "Epitaxial growth of YBa2Cu3O7-x thin films by a laser evaporation process" Appl. Phys. Lett. 53, 1557 (1988) and H. Maeda, Y. Tanaka, M. Fukotomi, and T. Asano, "A New High-Tc Oxide Superconductor without a Rare Earth Element" Jpn. J. Appl. Phys. 27, L209 (1988).

The electrostatically actuated capacitor 10 according to the invention may be fabricated by first forming the bottom electrode 20 and the anchor 25 on the substrate 30 using well-known metal deposition and etching techniques. A release layer (not shown), e.g., photoresist, is deposited over the bottom electrode 20 to provide mechanical support for the cantilever beam 25 during fabrication. A metal layer is, then deposited onto the release layer and the anchor 25 to form the cantilever beam 15. After the cantilever beam 25 is formed, the release layer underlying the cantilever beam 25 is removed to release the beam 25. For a release layer made of photoresist, acetone may be used to remove the support layer.

To induce a stress gradient in the metal layer of the beam 25, the intrinsic stress of the deposited metal forming the metal layer is increased during deposition of the metal layer. This way, the intrinsic stress in the metal layer increases in the direction from the bottom to the top of the metal layer.

This results in an intrinsic stress gradient in the metal layer that causes the cantilever beam 25 to curve upwardly as shown in FIG. 1. The intrinsic stress of the deposited metal can be increased during deposition of the metal layer by increasing the deposition rate and/or lowering the deposition temperature. This is because increasing the deposition rate and/or lowering the deposition temperature tends to reduce the ability of the deposited metal atoms to form complete bonds with each other, resulting in smaller crystal grain sizes in the deposited metal. The smaller crystal grain sizes in turn increase the intrinsic stress in the deposited metal. Therefore, a stress gradient can be induced in the metal layer of the beam 25 by increasing the deposition rate and/or lowering the deposition temperature during deposition of the metal layer. The deposition rate can be increase and/or the deposition temperature can be lowered continuously or incrementally during deposition of the metal layer.

The intrinsic stress in the deposited metal can also be increased during deposition by doping the deposited metal with dopants, e.g., cobalt, which induce stress in the deposited metal. The higher the doping level, i.e., concentration, in the deposited metal, the greater the intrinsic stress induced in the deposited metal. Therefore, a stress gradient can be induced in the metal layer by increasing the doping level in the deposited metal during deposition of the metal layer. The doping level in the deposited metal can be increased in addition to increasing the deposition rate and/or the lowering the deposition temperature to enhance the stress gradient in the metal layer.

The present invention contemplates at least three deposition techniques that can be used to induce the stress gradient in the metal layer namely, electroplating, evaporation, and sputtering. Using electroplating deposition, the intrinsic stress in the metal layer can be increased during electroplate deposition by varying the electroplating bath composition, current density and/or temperature. In one embodiment, a two step electroplate deposition process of a soft metal electroplate deposition followed by a hard metal electroplate deposition is used to form the metal layer of the cantilever beam 15. The deposited soft metal and the hard metal are both made of the same metal characterized by different crystal grain sizes. More particularly, the deposited hard metal is characterized by smaller crystal grain sizes, and therefore higher intrinsic stress, than the deposited soft metal. The hard metal can be realized by depositing the hard metal at a higher current density and/or lower temperature than the soft metal, where the higher current density translates into a higher deposition rate. The hard metal can also be realized by doping the hard metal at a higher doping level than the soft metal so that the hard metal has higher stress than the soft metal.

Using evaporation, the intrinsic stress in the metal layer can be increased during deposition by increasing the deposition rate of the metal layer, either continuously or incrementally. For example, an electron beam evaporator may be used to vary the gold deposition rate, e.g., between 0.1 and 1 nm/sec, during deposition of the metal layer in order to induce an intrinsic stress gradient in the metal layer.

Using sputtering (e.g., DC sputtering at 300 W power), the intrinsic stress in the metal layer can be increased during deposition by increasing the gas pressure of the sputtering, either continuously or incrementally. For example, the gas pressure of the sputtering may be varied between 0.8 and 2.4 Pa during deposition of the metal layer in order to induce an intrinsic stress gradient in the metal layer.

Figure 13:
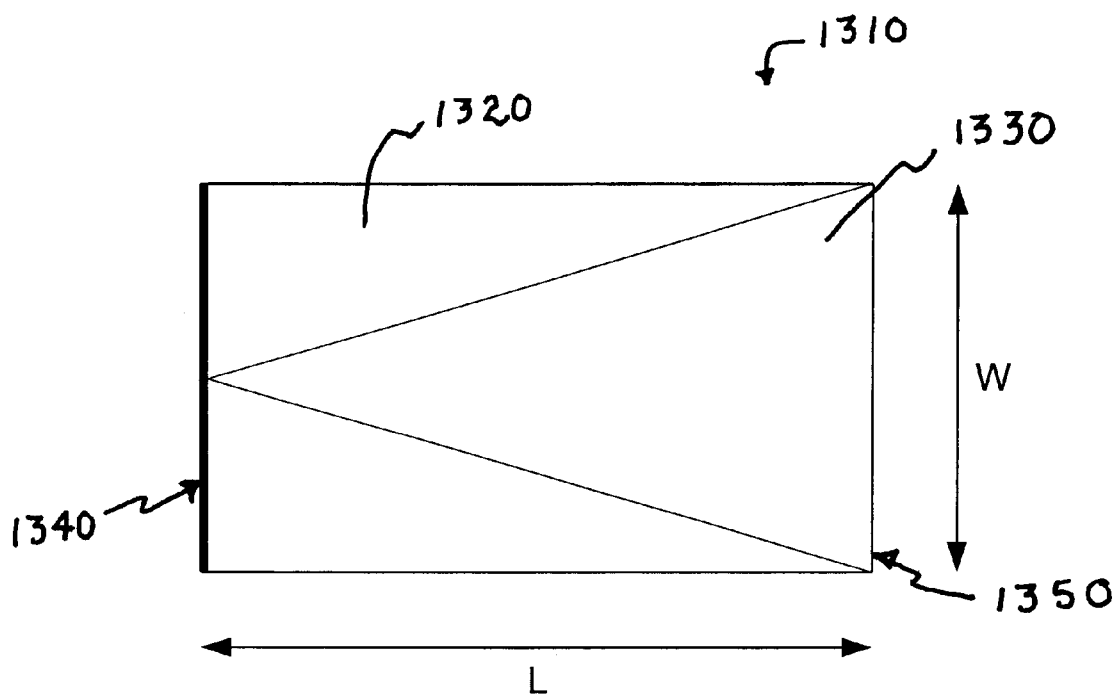
FIG. 13 is a top view of a cantilever beam according to an embodiment of the invention.

The deposition techniques discussed so far induce a stress gradient in the metal layer, in which the intrinsic stress increases along the thickness of the metal layer. The stress gradient can also be made to increase along the length of the metal layer. An example of one way of doing this is shown in FIG. 13, which shows a top view of a rectangular cantilever beam 1310 having a length, L, and a width, W, according to an embodiment of the present invention. The metal layer of the beam 1310 comprises deposited soft metal 1320 and deposited hard metal 1330 on top of the soft metal 1320. The deposited soft metal 1320 and the hard metal 1330 are both made of the same metal, i.e., gold, characterized by different crystal grain sizes. More particularly, the deposited hard metal 1330 is characterized by smaller crystal grain sizes, and therefore higher intrinsic stress, than the deposited soft metal 1320. The deposited soft gold 1320 is patterned to be rectangular in shape. The deposited hard metal, however, is patterned to be triangular in shape such that the width of the hard metal 1330 increases from the hinged, i.e., anchored, end 1340 of the beam 1310 to the tip end 1350 of the beam 1310. This produces a stress gradient in the beam 1310, in which the intrinsic stress increases along the length of the beam 1310 in moving from the hinged end 1340 of the beam 1310 to the tip end 1350 of the beam 1310. Even though the hard layer 1330 was triangular in shape in this particular example, those skilled in the art will appreciate that other shapes which increase the width of the hard layer 1330 from the hinged end 1340 to the tip end 1350 may also be used.

In operation, the initial curvature of the cantilever beam 15 produced by the stress gradient of the metal layer determines the low (or off) capacitance of the capacitor 10 with no applied bias voltage. The beam is electrostatically actuated by applying a bias voltage to the capacitor 10. The bias voltage establishes an electrostatic force on the cantilever beam 15 that deflects the beam 15 from its initial curvature relative to the bottom electrode 20. This beam deflection changes the inter-electrode gap 35 between the beam 15 and the bottom electrode 20, thereby changing the capacitance of the capacitor 10. Therefore, the capacitance of the electrostatically actuated variable capacitor 10 can be tuned by varying the bias voltage applied to the capacitor 10. The electrostatically actuated variable capacitor 10 according to the invention may be used in a variety of applications requiring highly selective tunable filters with a high Q factor, for example, by incorporating the electrostatically actuated variable capacitor into a filter circuit.

The cantilever beam 15 according to the invention offers several advantages over the bimetallic cantilever beam. One advantage is that the curvature of the cantilever beam 15 is relatively independent of time and temperature. This is because the curvature of the cantilever beam 15 is produced by an intrinsic stress gradient in a metal layer made of a single metal instead of a CTE mismatch between two different metals. Because the curvature of the beam 15 is relatively independent of temperature, the capacitance of the capacitor 10 does not vary with temperature. As a result, the capacitor 10 according to the present invention does not require precise temperature control for its operation. In addition, the mechanical and electrical properties of the cantilever beam 15 are not compromised by having to select two different metals with different CTEs to set the initial curvature of the beam because a single metal type is used. Furthermore, problems between the two different metal layers of the bimetallic beam, such as inter-metallic diffusion, are eliminated.

Those skilled in the art will appreciate that cantilever beam 15 according to the invention is not limited to use in a variable capacitor. For example, the cantilever beam 15 according to the invention can be used in an electrostatically actuated RF switch. An RF switch is typically similar in construction to the variable capacitor with no dielectric layer deposited over the bottom electrode so that the tip of the cantilever beam can make contact with the bottom electrode. When no bias voltage is applied to the beam, the beam does not contact the bottom electrode and the RF switch is open. When the beam is electrostatically actuated by a sufficient bias voltage, the beam is pulled down to make contact with the bottom electrode, thereby closing the RF switch.

Two analytical models of the cantilever beam according to the invention will now be developed. The first analytical model is used to model the initial curvature, i.e., deflection, of the cantilever beam with intrinsic stress gradient. In this model, a cantilever beam with dimensions of length, L, width, w, and thickness, b, is used in the derivation of the initial deflection of the beam. The beam is assumed to be fully clamped at one end and free at the other end. The stress in the top and bottom portion of the beam is assumed to be $\sigma_1$ and $\sigma_2$ respectively. Further, it is assumed that the in-plane deformation of the beam is negligible compared to its out-of-plane deformation. Assuming a linear stress profile within the beam, the stress can be divided into two components, as given in Equation 1, $$Stress = \left(\frac{\sigma_1+\sigma_2}{2}\right) + \left(\frac{\sigma_1-\sigma_2}{b}\right)(y) \quad \text{(Eq. 1)}$$

where y is taken along the thickness of the beam. The uniform stress $$\left(\frac{\sigma_1+\sigma_2}{2}\right)$$

accounts for the in-plane elongation of the beam whereas, the $$\left(\frac{\sigma_1-\sigma_2}{b}\right)(y)$$

(the stress gradient component) causes out of plane deflection. The net force on the element of area w dy is given by Equation 2, $$dF = \left(\frac{\sigma_1-\sigma_2}{b}\right) y \cdot w \cdot dy \quad \text{(Eq. 2)}$$

The moment about the axis through the center of the plane is given by Equation 3, $$dM = dF \cdot y = \left(\frac{\sigma_1-\sigma_2}{b}\right) \cdot y \cdot w \cdot dy \cdot y \quad \text{(Eq. 3)}$$

The net moment acting on the beam cross section can be obtained by integrating the Equation 3 over the thickness of the beam, as shown by Equation 4, $$\int_{-b/2}^{b/2} dM = \int_{-b/2}^{b/2} \left(\frac{\sigma_1-\sigma_2}{b}\right) \cdot y^2 \cdot w \cdot dy \quad \text{(Eq. 4)}$$

Using symmetry within the beam cross section, the net moment acting on the beam, M is given by Equation 5, $$M = 2 \cdot \left(\frac{\sigma_1-\sigma_2}{b}\right) \cdot \frac{b^3}{8 \cdot 3} \cdot w \quad \text{(Eq. 5)}$$

Therefore, the stress induced bending moment in the beam can be expressed by Equation 6, $$M = \left(\frac{\sigma_1-\sigma_2}{12}\right) \cdot b^2 \cdot w \quad \text{(Eq. 6)}$$

For a cantilever beam fixed at one end, with moment M acting on the other end, the governing equation for static deflection from continuum mechanics is given by Equation 7, $$EI\frac{d^2z}{dx^2} = M \quad \text{(Eq. 7)}$$

where, z is the deflection of the cantilever beam, E is elastic modulus of the material and I is the moment of inertia ($wb^3/12$). For the beam fixed at one end, the boundary conditions used are x=0, z=0, and x=0, (dz/dx)=0. Solving the differential equation, Equation. 7 with the above boundary conditions, and solving for the deflection, z, gives Equation 8, $$z = \frac{M}{EI}\frac{x^2}{2} = \left(\frac{\sigma_1-\sigma_2}{12}\right) \cdot \frac{b_w^2}{EI} \cdot \frac{x^2}{2} = \left(\frac{\sigma_1-\sigma_2}{12}\right) \cdot \frac{b_w^2}{EI} \cdot \frac{x^2}{2} \quad \text{(Eq. 8)}$$

where z gives the height of the beam with respect to the fixed end (x=0) of the beam as a function of position, x, along the length of the beam.

The second analytical model is used to mathematically model the deflection of the cantilever beam as a function of applied voltage. In this model, the initial curvature of the cantilever beam is modeled as if the beam were made of two different materials. This is done strictly to provide a mathematically model of the cantilever beam, and is not intended to describe the actual physical composition of the beam. See, e.g., S. Timoshenko, "Analysis of bi-metal thermostats", Journal of structural analysis & R.S.I, September, 1925, and Y. H. Min, Y. K. Kim, "In situ measurement of residualstress in micromachined thin films using a specimen with composite-layered cantilevers", J. Micromech, Microeng. 10 (2000) 314–321. In this model, the stress gradient of the beam can be created by using two materials with dissimilar coefficient of thermal expansion (CTE). Due to the CTE mismatch between the two materials, the cantilever beam can be made to deflect away from its original position in the positive (upward) or in the negative (downward) direction by changing the temperature. The theory for modeling the beam using this approach is presented as follows.

The change in radius of curvature of a bimetallic cantilever beam would be same as that of a free standing bimetallic strip of:twice the length of the cantilever beam. Assuming that the bimetallic beam is planar (flat) at room temperature, the final radius of curvature of the freestanding film can be calculated. If there are no external forces acting on the bimetallic beam, then $$P_1 = P_2 = P(\text{equilibrium}) \quad \text{(Eq. 9)}$$

$$P\left(\frac{t_1 + t_2}{2}\right) = M_1 + M_2 \qquad \text{(Eq. 10)}$$

where $M_1$ and $M_2$ are the moments given by $$M_1 = \frac{E_1 I_1}{\rho}, \quad M_2 = \frac{E_2 I_2}{\rho},$$

$P_1$, $P_2$ are the external forces applied on the top and bottom layer, respectively, of the beam, and $\rho$ is the radius of curvature of the beam. The moment of inertia of the top layer, $I_1$, is given by ($b*t_1^3/12$) and the moment of inertia of the bottom layer, $I_2$, is given by ($b*t_2^3/12$), where, b is the width of the cantilever beam, and $t_1$ and $t_2$ are the thickness of the top and bottom layer respectively. Also, $E_1$, $E_2$ are the Elastic modulus of the materials of the top and bottom layer, respectively, of the beam. Due to the CTE mismatch, the strain developed in the two materials must be equal which leads to Equation 11, $$\alpha_1(\Delta T) + \frac{P}{E_1(bt_1)} + \frac{t_1}{2\rho} = \alpha_2(\Delta T) - \frac{P}{E_2(bt_2)} - \frac{t_2}{2\rho} \qquad \text{(Eq. 11)}$$

where, $\alpha_1$ and $\alpha_2$ are the CTE's of material of two layers, and $\Delta T$ is the change in temperature, Substituting the expressions for P from Equation 10, and for the beam with initial radius of curvature of $\rho_0$, the change in radius of curvature is given by Equation 12, $$\frac{1}{\rho} - \frac{1}{\rho_o} = \frac{(\alpha_2 - \alpha_1)(\Delta T)}{\frac{h}{2} + \frac{2(E_1 I_1 + E_2 I_2)}{bh}\left(\frac{1}{E_1 t_1} + \frac{1}{E_2 t_2}\right)} \qquad \text{(Eq. 12)}$$

where $h = t_1 + t_2$. The initial deflection of the bimetallic cantilever beam along the length, z(x) is given by Equation 13, $$z(x) = \frac{x^2}{2}\left(\frac{1}{\rho} - \frac{1}{\rho_o}\right) \qquad \text{(Eq. 13)}$$

Thus, the initial deflection of the curved actuator can be modeled if the thickness, elastic modulus, and CTE of the materials are known.

The electrostatic force acting on the movable electrode is given by $$F = \frac{\varepsilon A V^2}{2g^2},$$

where, $\in$ is the permittivity of the medium, A is the area of the electrodes, V is the applied voltage, g is the gap distance between the beam and the bottom electrode, which is equal to the sum of the initial gap distance, z, and displacement, y, between the fixed end of the beam and the bottom electrode. The force per unit length acting on the cantilever beam is $$\frac{\varepsilon V^2}{2g^2} \times b.$$

From the continuum mechanics, $$EI\frac{d^4 y}{dx^4} = -\frac{V^2 \varepsilon b}{2(y+z)^2} \qquad \text{(Eq. 14)}$$

where, EI is the flexural rigidity of the beam, and z is the height of the beam as a function of distance, x, along the length of the beam from the fixed end of the beam, x=0. The height z(x) can be obtained either by using the stress gradient model of the first model or by approximating the beam by a bimetal composite and matching the initial deflection. Equation 14 is a fourth order nonlinear differential equation, which can be solved for z(x) using following boundary conditions.
1. y(x=0)=0 No deflection at the fixed end of the beam.
2.

$$\frac{dy}{dx}(x = 0) = 0$$

Slope of the deflection at the fixed end is zero.
3.

$$\frac{d^2 y}{dx^2}(x = L) = 0$$

No moment acting on the free end.
4.

$$\frac{d^3 y}{dx^3}(x = L) = 0$$

No shear force acting on the free end.

Using the above boundary conditions, Equation 14 can be solved numerically for different points along the beam by employing finite difference techniques. To model the deflection of an actual cantilever beam, built in accordance with the invention, the initial curvature of the model beam is matched to the measured initial curvature of the actual beam. This can be done, example, by adjusting the values of the CTE values, $\alpha_1$ and $\alpha_2$, of the two materials of the model beam until the initial curvature of the model beam matches the measured curvature of the actual beam. Once the initial curvature of the model beam is matched to the curvature of the actual beam, the model beam can be used to model the deflection of the actual beam as a function of voltage by varying the applied voltage, V, of the model beam.

Once the height, z(x), of the cantilever beam is known as a function of position, x, along the length of the beam, the capacitance between the beam (top electrode) and the bottom electrode can be calculated using Equation 15, $$C = \int_0^L \frac{\varepsilon_o w \, dx}{\left(g_{air} + \frac{1}{k} g_{dielectric}\right)} \qquad \text{(Eq. 15)}$$

where $g_{air}$ is the gap between the beam and the bottom electrode with air as the dielectric medium, $\in$ is the permittivity of air, k is the relative permittivity of a dielectric layer deposited over the bottom electrode, and $g_{dielectric}$ is the thickness of the dielectric layer. The gap, $g_{air}$, between the beam and the bottom electrode with air as the dielectric medium can be determined by adding the height z(x) of the beam with respect to the height of the fixed end (x=0) of the beam, to the height of the fixed end of the beam with respect to the dielectric layer. The height z(x) of the beam can be determined using the first or second model. Equation 15 can be numerically integrated along the length, L, of the beam to determine the capacitance of the device.

An exemplary sequence of process steps for fabricating an electrostatically actuated capacitor according to an embodiment of the invention will now be described with respect FIG. 2. In step (a) of FIG. 2, a silicon wafer (e.g., (100) n-SI wafer) with a thermally grown oxide layer (e.g., 400 nm thick) is used as a base substrate 120 for the capacitor. In addition, an aluminum layer 130 (e.g., 0.4 µm thick) is deposited onto the substrate using a DC magnetron sputterer. In step (b), the aluminum layer 130 is patterned to form the bottom electrode 135 and a base for the anchor 132 of the capacitor. In step (c), a 1.6 µm thick dielectric polymer 145 is deposited onto the wafer and patterned using a photoresist (Shipley Chemical Co. 1800 series) to form a via for contact to the top electrode (cantilever beam). In step (d), a titanium layer (e.g., 30 nm thick) followed by a gold layer (e.g., 1 µm thick) are deposited onto the wafer using electron-beam evaporation (CVC products) at a rate of 0.3 nm/sec. In step (e), the gold and titanium layers are patterned to form the cantilever beam anchor 147. A potassium iodide etchant (potassium iodide 100 g/l and iodine 25 g/l) may be used to etch the gold layer. An EDTA etchant (0.1 M ethylenediaminetetraacetate, disodium salt dihydrate solution, adjusted to a pH of 11 with 5% $H_2O_2$) may be used to etch the titanium layer. In step (f), a Shipley 1800 series photoresist is spun onto the wafer at 3000 rpm to a thickness of 1.5 µm and patterned to form a photoresist release layer 150 for the cantilever beam. In step (g), a titanium and gold layer is deposited onto the wafer and patterned to form the cantilever beam 155. In this embodiment, the gold layer forms the metal layer with the intrinsic stress gradient.

A two step deposition process of a soft gold electroplate deposition followed by a hard gold electroplate deposition is used to form the gold layer of the cantilever beam 155. A titanium and gold layer (20 nm and 200 nm thick, respectively) deposited at a rate of 0.2 nm/sec onto using e-beam evaporation is used as a seed layer for the electroplate deposition of the soft and hard gold. The deposited soft gold is characterized by low residual intrinsic stress. A buffered cyanide gold plating bath ($KAu(CN)_2$ 20 g/l, $K_2HPO_4$ 40 g/l, $KH_2PO_4$ 10 g/l adjusted to a pH of 7) at a current density of 2 to 10 mA/cm² at a temperature of 60° C. may be used to deposit the soft gold and an acid cyanide plating bath ($KAu(CN)_2$ 15 g/l, citric acid 50 g/l, cobalt (added as acetate) 0.07 g/l, adjusted to a pH of 3.5) at a current density of 5 mA/cm² and room temperature may then be used to deposit the hard gold. The acid cyanide plating bath dopes the hard gold with cobalt to further enhance the intrinsic stress of the hard gold. Even though different gold plating baths were used to deposit the soft and hard gold, the same gold plating bath could have been used to deposit both the soft and hard gold. In addition, even though gold was deposited, the invention can be extended to other types of metals, which can be deposited using electroplating, such as silver.

In step (h), the photoresist release layer 150 is removed using acetone to release the cantilever beam 155. The titanium adhesion layer below the gold layer of the cantilever beam 155 is etched using the EDTA solution. The released cantilever beam 155 is then rinsed using isopropanol and methanol, and dried in the nitrogen-purged oven at 90° C.

If the cantilever beam is immediately dried after it is rinsed in methanol, the cantilever beam 155 may experience stiction due to the surface tension of the methanol. The surface tension of the draining liquid (methanol) may draw the cantilever beam 155 into contact with the underlying substrate. A Self-Assembled Monolayer (SAM) may be used to create a hydrophobic surface on the cantilever beam 155 to eliminate the in-use stiction problem. The SAM may be formed by soaking the released cantilever beam 155 in a 1 mM dodecyl-thiol solution.

A sequence of process steps for fabricating an electrostatically actuated capacitor according to another embodiment is shown in FIG. 3. The capacitor according to this embodiment has a segmented bottom electrode. In step (a) of FIG. 3, an aluminum layer 210 (e.g., 400 nm thick) is deposited onto a base substrate 220 using DC magnetron sputterer. In step (b) the aluminum layer 210 is patterned to form a segmented bottom electrode 232 and a base 235 for the anchor. A polymer material (e.g., 1.6 µm thick) is also deposited to form a dielectric layer 240 over the bottom electrode 232. In step (c), the dielectric layer 240 is patterned to form a via 245 for the anchor. In step (d), a photoresist layer 250 (e.g., 1.5 µm thick) is deposited onto the wafer and patterned to expose the via 245. In step (e), a titanium (e.g., 30 nm thick) and gold (e.g., 1 µm thick) layer 255 is deposited onto the wafer using electron beam evaporation (CVC products). In step (f), the titanium and gold layer 255 is patterned to form the anchor 260 in the via 245. In step (g) a photoresist layer in deposited (e.g., 1.5 µm thick) and removed from the via 245 to form a release photoresist layer 265. Titanium (e.g., 30 nm thick) followed by gold (e.g., 200 nm thick) are deposited on top of the photoresist release layer 265 and anchor 260 to form a seed layer for electroplate deposition. In step (h), a soft gold layer 270 is electroplate deposited using in a buffered cyanide gold plating bath ($KAu(CN)_2$ 20 g/l, $K_2HPO_4$ 40 g/l, $KH_2PO_4$ 10 g/l adjusted to a pH of 7) at current density of 3 mA/cm² and a temperature of 60° C. In step (i), a hard gold layer 275 is electroplate deposited onto the soft gold layer 270 in a an acid cyanide plating bath ($KAu(CN)_2$ 15 g/l, citric acid 50 g/l, cobalt (added as acetate) 0.07 g/l, adjusted to a pH of 3.5) at a current density of 5 mA/cm² and room temperature. The hard gold layer 275 exhibits higher intrinsic stress than the underlying soft gold layer 270 due to the smaller crystal grain size of the hard gold layer 275. In step (j), the soft gold layer 270 and the hard gold layer 275 are patterned, e.g., using conventional lithographic techniques, to form the cantilever beam 280 of the capacitor. The cantilever beam 280 is released by dissolving the photoresist release layer in acetone. Stiction during the release of the cantilever beam 280 may be reduced by treating the cantilever beam with an alkane thiol solution to form a hydrophobic Self-Assembled Monolayer (SAM) on the gold. The SAM may be formed by soaking the released cantilever beam 280 in a 1 mM solution of dodecyl thiol in an absolute ethanol solution.

Four actuators with full-hinged cantilever beams were built in accordance with the present invention using the process in FIG. 2. Each one of the cantilever beams had a length and width of 1 mm and 0.5 mm, respectively. In addition, each one of the cantilever beams had a soft gold thickness of about 2.2 µm and a different hard gold thickness. The hard gold thicknesses for the four cantilever beams were 0, 0.1, 0.2 and 0.3 µm.

The tip angle for each one of the four cantilever beams was measured using Scanning Electron Microscopy (SEM) imaging. The tip angle of each cantilever beam gave a direct measure of the deflection of the cantilever beam. The cantilever beam with the zero hard gold thickness exhibited no curvature. This indicates that the residual stress in the soft gold layer alone was not sufficient to overcome the van der Waals and surface forces acting on the cantilever beam. The cantilever beam with the hard gold thickness of 0.1 μm had a tip angle of 18° and a radius of curvature of 3.2 mm. The cantilever beam with the hard gold thickness of 0.2 μm had a tip angle of 35° and a radius of curvature decreased to 1.64 mm. Finally, the cantilever beam with the hard gold thickness of 0.3 μm had a tip angle of 72° and a radius of curvature of 795 μm. From the above tip angle values, it can be seen that the initial deflection of the cantilever beam is directly proportional to the thickness of the hard gold.

Figure 4:
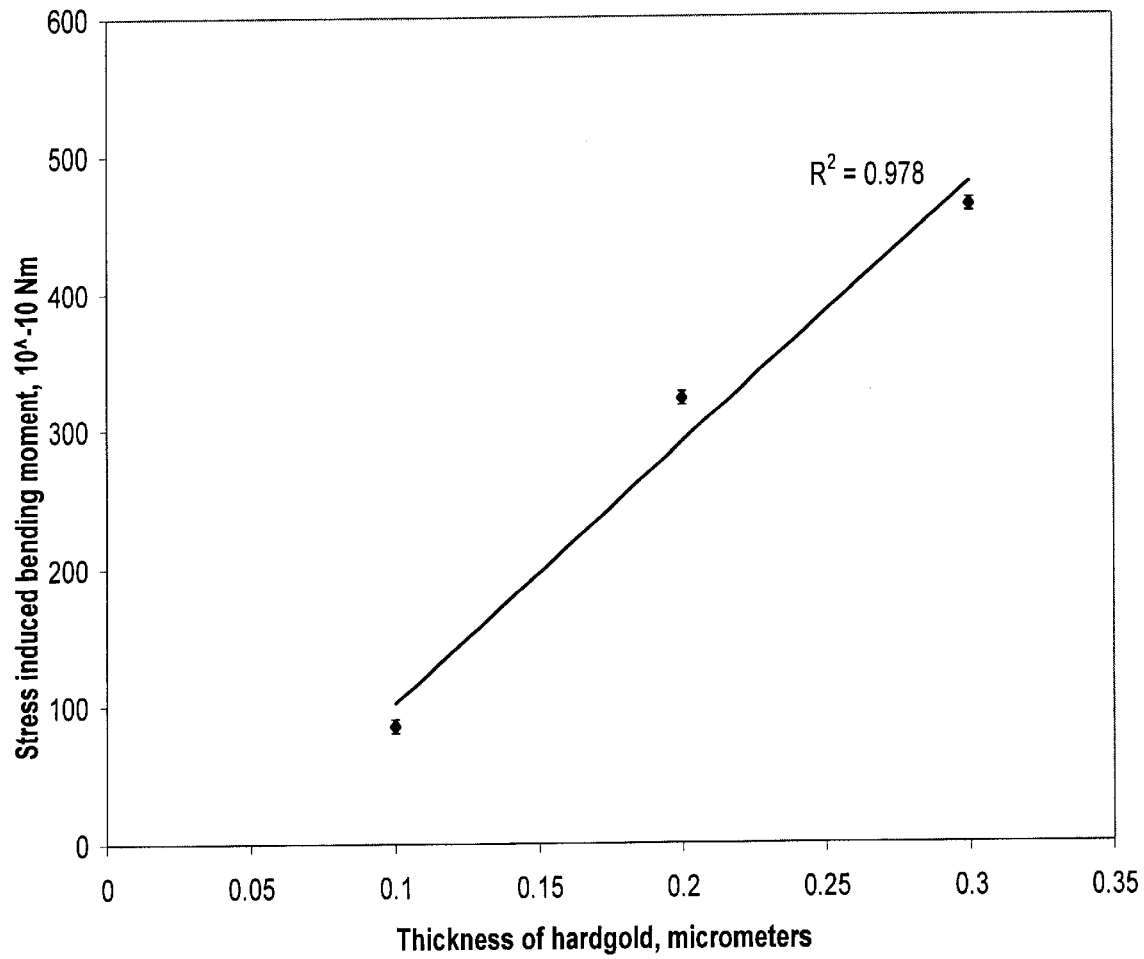
FIG. 4 is a graph of the induced bending moment of a cantilever beam as a function of hard gold thickness.

FIG. 4 is a graph of the estimated stress induced bending moments (Nm) for the above cantilever beams plotted as a function of hard gold thickness. The induced bending moment gives a measure of the amount of out-of-plane force exerted on a cantilever beam due to the deposition of the hard gold. The estimated stress induced bending moments plotted in FIG. 4 are calculated using Equation 6, $$M = \left(\frac{\sigma_1 - \sigma_2}{12}\right) \cdot b^2 \cdot w$$

where $\sigma_1$ is the stress of the hard gold layer, $\sigma_2$ is the stress of the soft gold layer (assumed to be zero), b is the thickness of the beam, and w is the width of the beam. The stress of the hard gold $\sigma_1$ is estimated from the curvature of the beam. The bending moment for the beam deposited with 0.1 μm of hard gold is $86 \times 10^{-10}$ Nm. The estimated bending moments for the hard gold thickness of 0.1, 0.2 and 0.3 μm were fitted to a line using a least-squares fit method. The degree of fit of the estimated bending moments to the line is $R^2=0.978$, where $R^2=1$ indicates a perfect linear fit. It can be seen from FIG. 4 that the bending moment acting on the cantilever beam is approximately linearly proportional to hard gold thickness.

Figure 5:
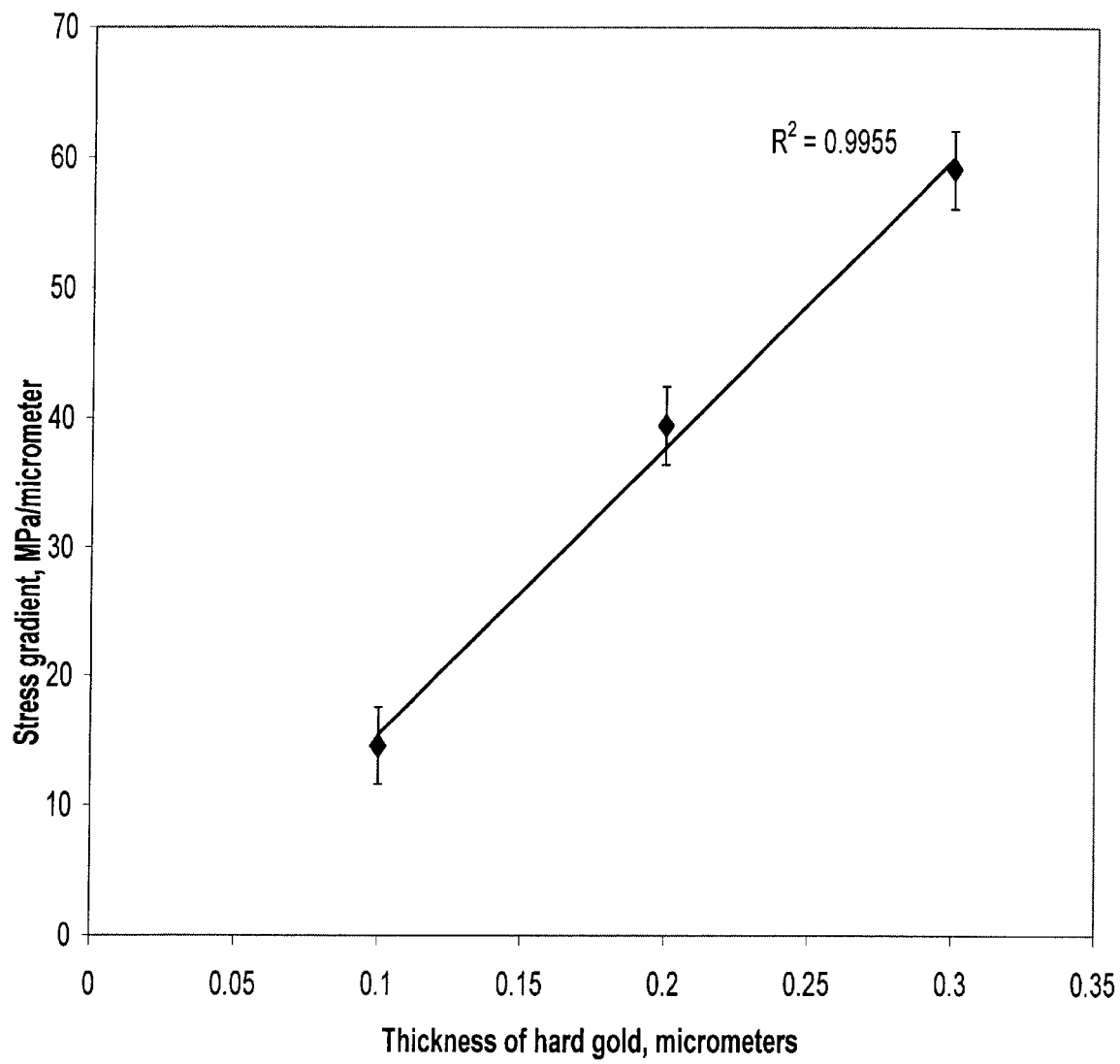
FIG. 5 is a graph of the stress gradient of a cantilever beam as a function of hard gold thickness.

FIG. 5 is a graph of calculated values of the intrinsic stress gradient in the cantilever beams plotted as a function of hard gold thickness. The residual stress gradients plotted in FIG. 5 are calculated using Equation 8, where a bulk elastic modulus, E, of 74 GPa is used for the gold. The effective residual stress gradient in the cantilever beam deposited with 0.1 μm of hard gold is 15.5 MPa/μm. The calculated stress gradients for the hard gold thickness of 0.1, 0.2 and 0.3 μm are fitted to a line using a least-squares fit method. The degree of fit of the calculated stress gradients to the line is $R^2=0.9955$. It can be seen from FIG. 5 that the intrinsic stress gradient approximately increases linearity with the hard gold thickness.

Assuming that the residual stress in the soft gold is zero and the modulus of the gold is dominated by the modulus of soft gold (soft gold thickness is 2.3 μm compared to hard gold thickness of between 0.1 and 0.3 μm), Stoney's equation can be used to calculate the stress in the hard gold. See G. G. Stoney, "The tension of metallic films deposited by electrolysis," Proc., Royal Society, A82, pp. 172–175, 1909.

The effect of aging on the deflection of cantilever beams built in accordance with the invention was also studied. The beam's had a soft gold thickness of 2.2 μm and a hard gold thickness of 0.3 μm. The effect of aging was accelerated by subjecting the cantilever beams to annealing temperatures for extended periods of time. The effect of the annealing temperature on the cantilever beams was tested by measuring the tip deflection of the cantilever beams before and after annealing. The cantilever beams were placed in a vacuum oven at 100° C. for 48 hours (2 days). The tip deflection of the cantilever beams was measured using an optical microscope before and after annealing. The effect of the annealing temperature is given in Table 1, which shows the length, L, width, B, and tip deflection before and after annealing for the cantilever beams studied.

TABLE 1

| | Average tip deflection, μm | |
|---|---|---|
| L × B | Before annealing, | After annealing |
| 1 mm × 0.5 mm | 675 | 762 |
| 2 mm × 0.5 mm | 1292 | 1392 |
| 2 mm × 1 mm | 1333 | 1438 |
| 1 mm × 1 mm | 863 | 945 |
| 0.5 mm × 1 mm | 367 | 390 |

From the average value of the tip deflection for the cantilever beams before and after annealing, it can be concluded that there is approximately a 10% increase in the deflection of the beams. Recrystallization of the gold in the beams and plastic deformation of the gold at the anchor region due to CTE mismatch between the gold and silicon (CTE of gold=14.7 ppm/° C., CTE of silicon=2.7 ppm/° C.) account for the change in tip deflection of the cantilever beams. The error in the measurement of the tip deflection using this technique was ±5 μm.

The deflection of a cantilever beam built in accordance with the present invention was measured as a function of temperature. The cantilever beam had a soft gold thickness of 2.2 μm, a hard gold thickness of 0.3 μm and a length of 500 μm. The room temperature tip deflection of the cantilever beam was approximately 120 μm. There was negligible change in the tip deflection when the temperature was lowered to −50° C. and when the temperature was raised to 125° C. Therefore, the initial curvature of the beam was largely independent of temperature in the temperature range of −50° C. to 125° C. The error in the measurement was ±5 μm.

In another study, five actuator devices where built in accordance with the invention using the process in FIG. 3 to study voltage-deflection characteristics of the cantilever beam. The cantilever beams of these devices had different shapes and anchor attachments. FIG. 6 shows the top dimensions (given in μm) of the five cantilever beams, which include (a) a full-hinged square, (b) a full-hinged semicircle, (c) a double-hinged square, (d) a double-hinged half ellipse, and (e) a double-hinged rectangular shaped cantilever beam. The darkened regions in the FIG. 6 devices show the anchor regions for each of the beams. The area of the various electrodes in FIG. 6 is the same resulting in a similar net force applied to each of the electrodes at a given voltage. In each of these actuators, the stationary electrode covered the full area under the beam. Each of the five devices in FIG. 6 were tested to evaluate the effect of initial tip deflection, anchor type, and shape of the beam on the deflection-voltage behavior of the device. The deflection-voltage behavior of the device describes the deflection of the beam as a function of the applied bias voltage to the device.

Figure 7:
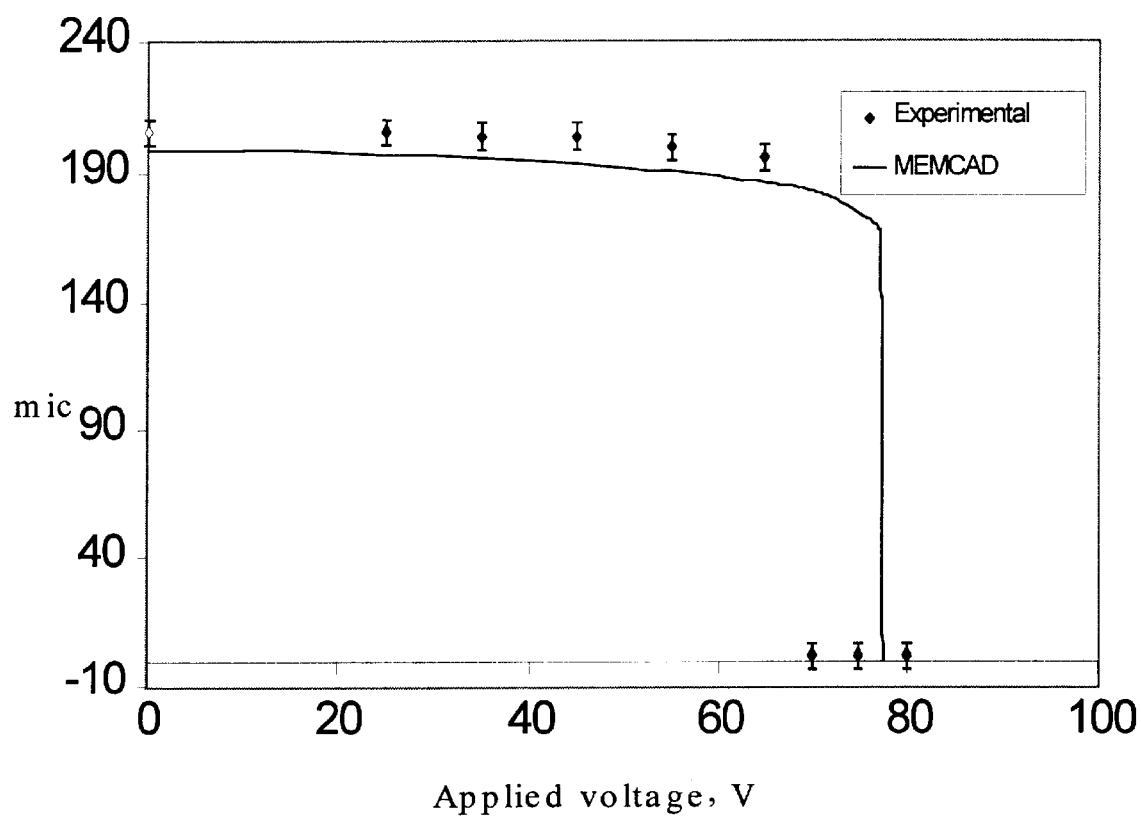
FIG. 7 is a graph of the deflection-voltage behavior of a double-hinged square beam according to an embodiment of the invention.

FIG. 7 shows the deflection-voltage behavior of the actuator with the double-hinged square beam of FIG. 6(c). The square beam had a soft gold thickness of 2.2 μm and a hard gold thickness of 0.1 μm. The initial tip deflection of the beam was 206±5 μm (zero applied voltage). At a bias voltage of 70 V, the square beam was pulled down and made physical contact with the bottom dielectric. The solid line in FIG. 7 shows 3-D modeling results for the tip deflection obtained using MEMCAD. MEMCAD is a commercial available modeling and design software for MEM devices developed by Coventor, Inc. The pull-down voltage calculated by the 3-D model was 77.25 V. A stress gradient of 20 MPa/$\mu$m over the thickness of the beam gave an initial tip deflection of 200 $\mu$m using the 3-D model. The curvature produced by the 3-D model was similar to the measured curvature of the beam.

Figure 8:
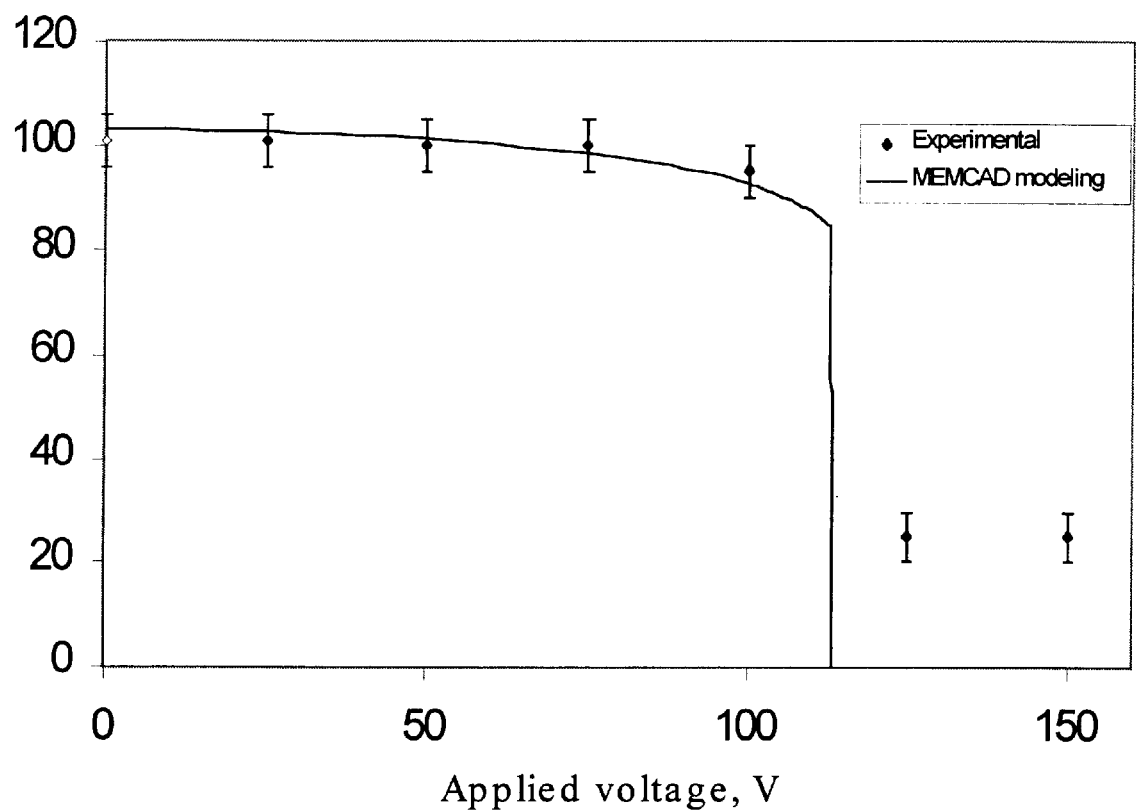
FIG. 8 is a graph of the deflection-voltage behavior of a full-hinged semicircle beam according to an embodiment of the invention.

FIG. 8 shows the deflection-voltage behavior of the actuator with the full-hinged semicircular shaped beam of FIG. 6(b). The beam had a soft gold thickness of 2.3 $\mu$m and a hard gold thickness of 0.2 $\mu$m. The initial tip deflection of the beam was 101±5 $\mu$m (zero applied voltage). Continuous deflection of the beam occurred up to a bias voltage of 100 V. At 100 V, the tip deflection of the beam was 95±5 $\mu$m. Upon further increase in voltage to 125 V, the beam was pulled down and made contact with the bottom dielectric. The center portion of the beam was in contact with the bottom dielectric but the tip was still raised 25±5 $\mu$m above the dielectric. In other words, the center portion of the beam touched down but not the tip. The solid line in FIG. 8 shows modeling results for the tip deflection obtained using MEMCAD. The pull-down voltage as predicted by MEMCAD modeling was 113.25 V.

Figure 9:
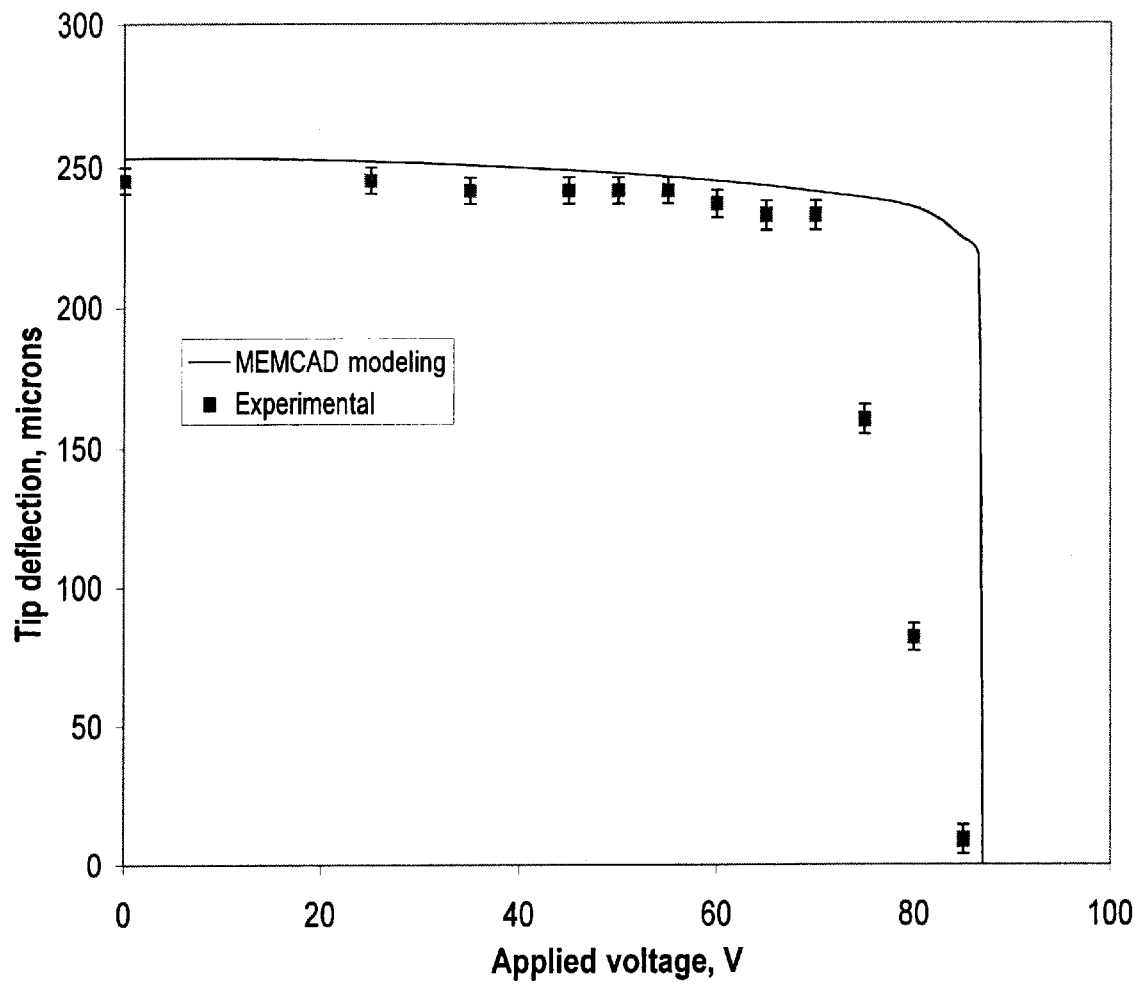
FIG. 9 is a graph of the deflection-voltage behavior of a double-hinged elliptical beam according to an embodiment of the invention.

FIG. 9 shows the deflection-voltage behavior for the actuator with the double-hinged elliptical beam of FIG. 6(d). The beam had a soft gold thickness of 2.3 $\mu$m and a hard gold thickness of 0.2 $\mu$m. The initial tip deflection of the beam was 245±5 $\mu$m. The tip deflection of the beam changed continuously from 0 V to 70 V, as shown in FIG. 9. When the voltage was increased to 75 V, the beam was partially pulled down and the center of the beam made contact with the bottom dielectric resulting in a tip deflection of 150±5 $\mu$m. As the bias voltage was further increased to 80 V, the beam further uncurled and had a tip deflection of 75±5 $\mu$m. The beam was pulled down flat at 85 V. A stress gradient of 40 MPa/$\mu$m was used to model the beam using MEMCAD. The 3-D MEMCAD model predicted that the elliptical beam should remain stable from 0 V to 86 V followed by pull-down at 86.5 V.

Figure 10:
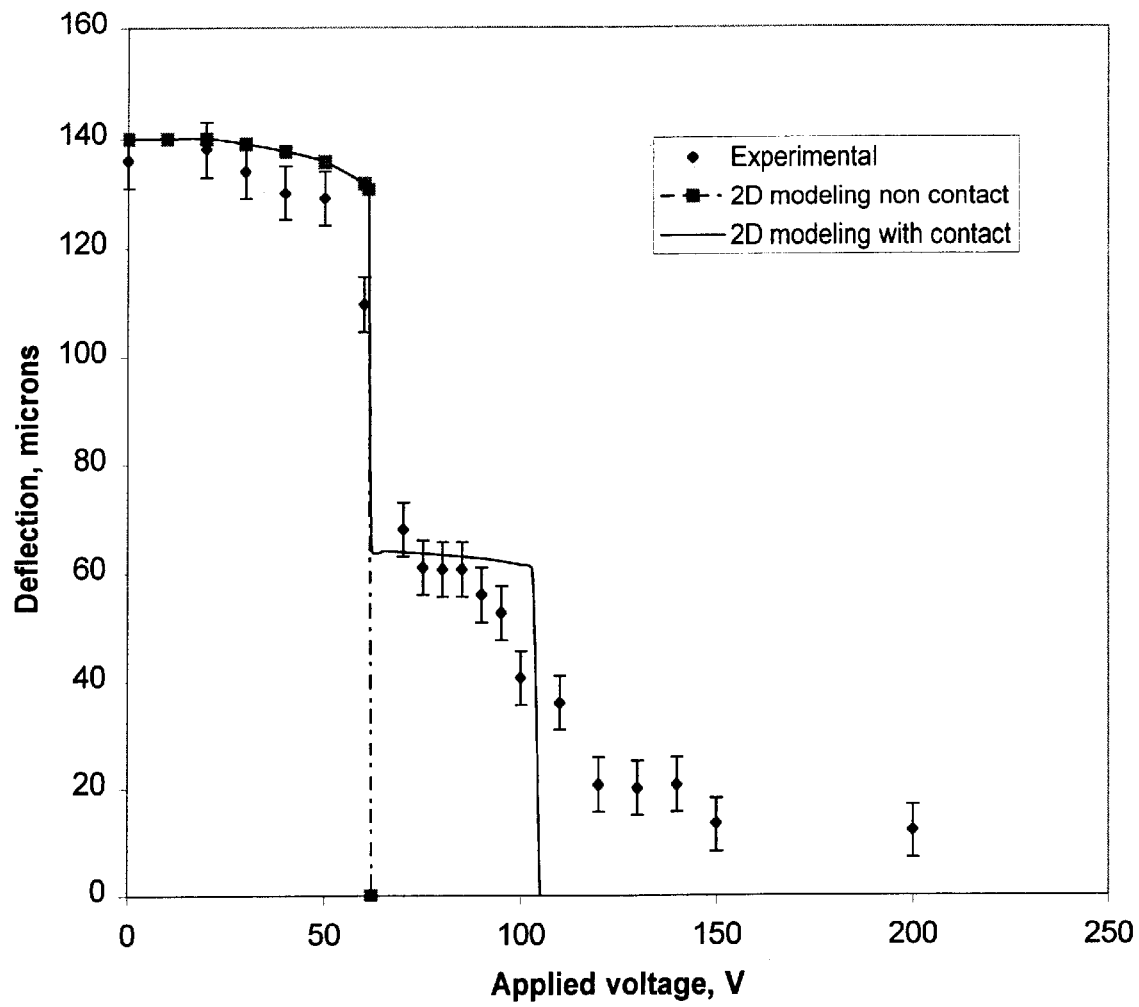
FIG. 10 is a graph of the deflection-voltage behavior of a full-hinged square beam according to an embodiment of the invention.

FIG. 10 shows the deflection-voltage characteristics of the actuator with the full-hinged square shaped beam FIG. 6(a). The beam had a soft gold thickness of 2.3 $\mu$m and a hard gold thickness of 0.2 $\mu$m. The initial tip deflection of the beam was 136±5 $\mu$m. As the bias voltage was increased to 50 V, the tip deflection of the beam decreased to 129±5 $\mu$m. The center portion of the beam made contact with the bottom dielectric at 65 V. At 65 V the beam tip was 68±5 $\mu$m above the dielectric. At higher applied voltages, the beam smoothly uncurled to a tip deflection of 52±5 $\mu$m before snapping down. The analysis of this device indicates that the initial curvature of the beam deviated from the second order polynomial relationship. Once the center portion of the beam made contact with the bottom dielectric, the remaining length of the beam was stiffer leading to higher pull-down voltages prior to complete snap-down. The dashed lines in the graph show the 2-D finite difference modeling of this device. The calculated value of the pull-down voltage was 62 V compared to the measured value of 65 V. It was observed that at 65 V, the remaining movable portion of the beam had an active length of 40% of the original length of the actuator. 2-D analysis was performed on the beam with this reduced length, which was assumed to be fixed at one end, so the deflection could occur only at the other end. The radius of curvature of the reduced length beam was assumed to be the same as the full-length beam. This gave a calculated tip deflection of 64 $\mu$m at the partial pull-down point compared to the actual value of 68 $\mu$m. The predicted value of second pull-down voltage (reduced length) was 105 V.

Figure 11:
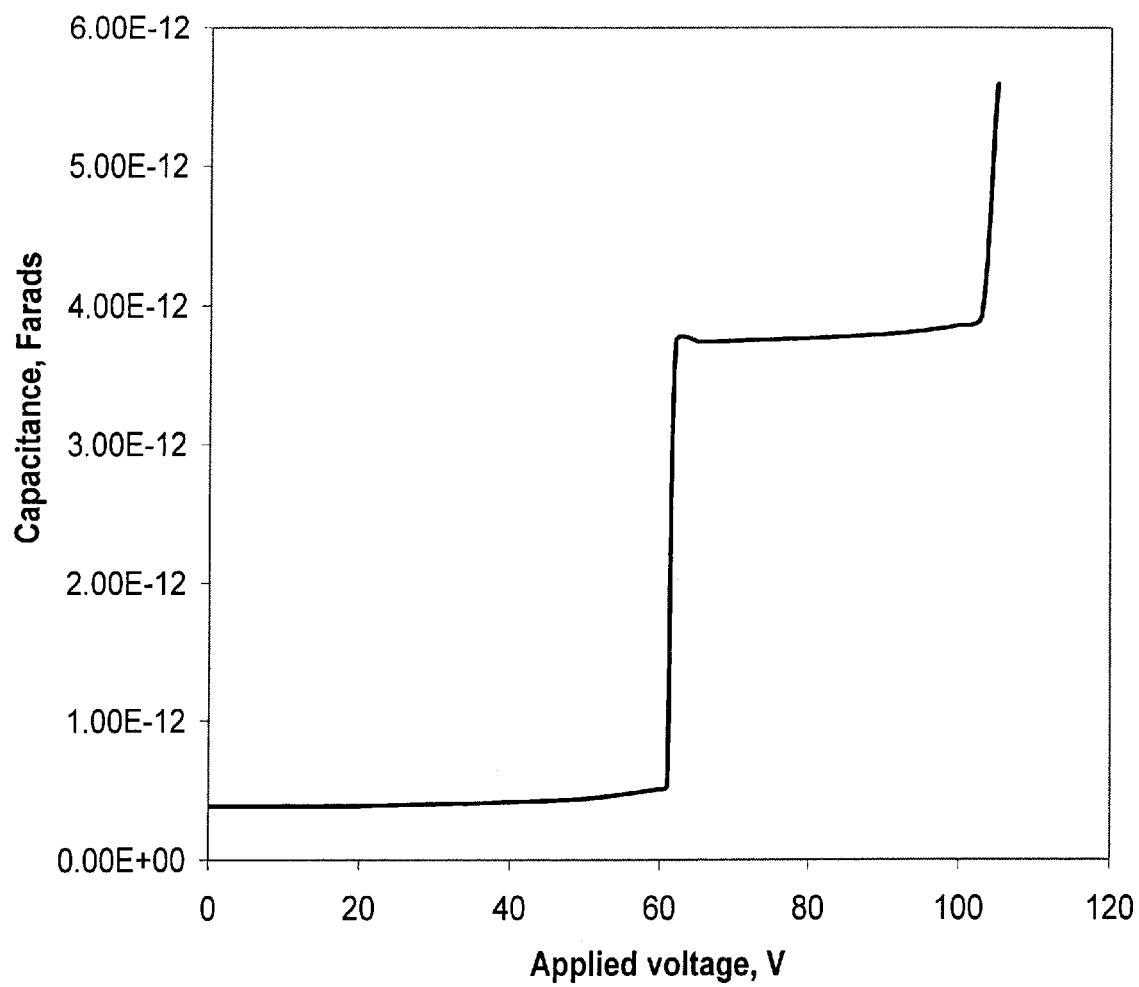
FIG. 11 is a graph of the capacitance of the full-hinged square beam as a function of applied bias voltage.

FIG. 11 shows the calculated value of capacitance of this device as a function of bias voltage. The solid line shows the capacitance vs. applied voltage obtained from the two step pull-down voltage analysis. The initial capacitance of the device was 0.4 pF and increased to 0.53 pF at 60 V. Thus, the device had a tunable capacitance range of about 32.5% between 0 and 60 V. The capacitance value increased to 3.74 pF at first snap-down. The capacitance smoothly changed to 3.93 pF at 100 V followed by a maximum capacitance of 5.6 pF.

Figure 12:
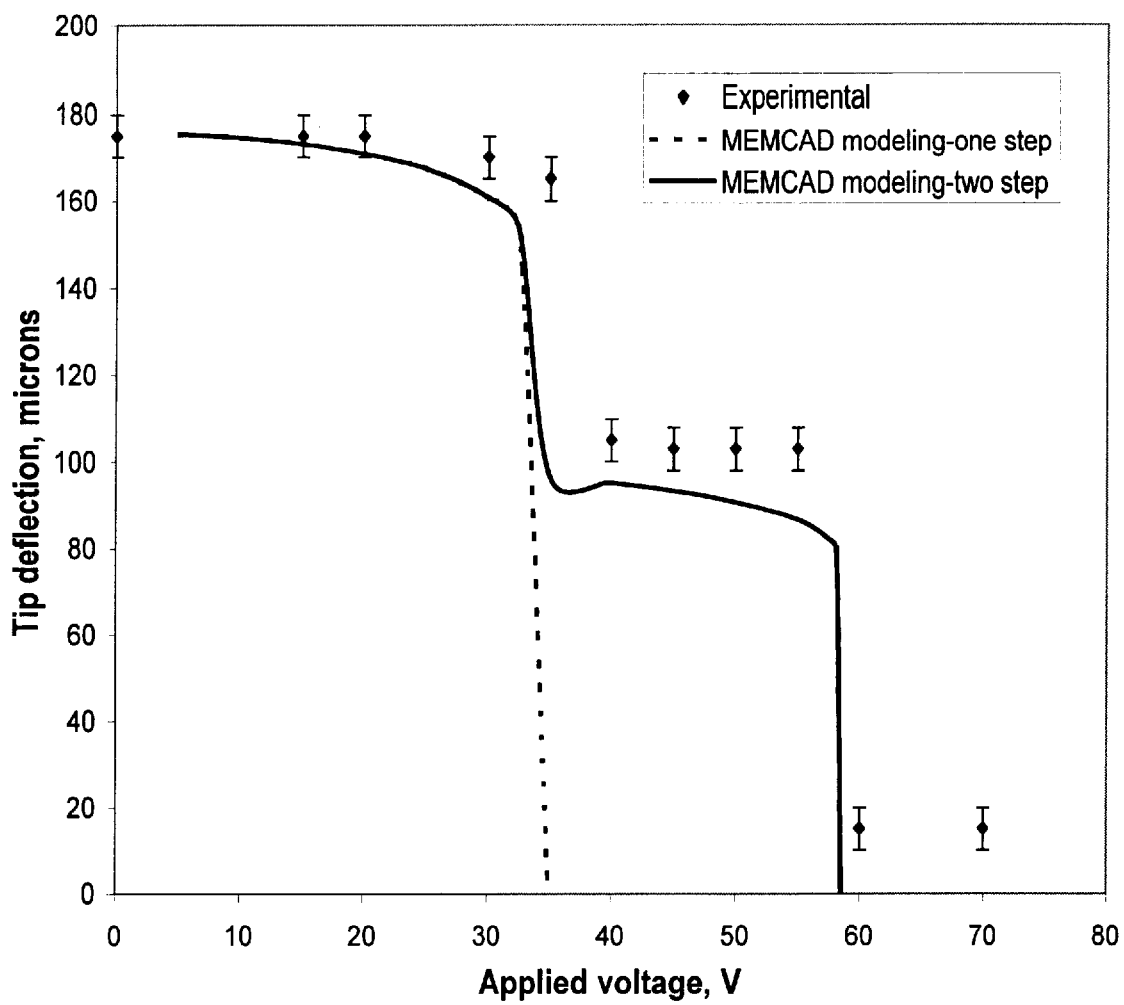
FIG. 12 is a graph of the deflection-voltage behavior of a double-hinged rectangle beam according to an embodiment of the invention.

FIG. 12 shows the deflection-voltage behavior of the actuator with the double-hinge rectangular beam of FIG. 6(e). The beam had a soft gold thickness of 2.3 $\mu$m and a hard gold thickness of 0.2 $\mu$m. As the bias voltage was increased, it can be seen that the beam snapped down in a manner similar to the full-hinged square beam. The beam had an initial tip deflection of 175±5 $\mu$m and was pulled down at a voltage of 40 V leading to second stable region. The tip deflection of the device at 40 V was 105±5 $\mu$m. The beam snapped down to its final state at 60 V. A 3-D MEMCAD analysis (dashed lines) gave a pull-down voltage of 35 V. The length of the movable portion was of the beam observed to be 70% of the full beam length. Using this reduced length as the "new" cantilever beam, the second pull-down voltage was calculated to be 58.5 V compared to the observed value of 60 V.

The results of the electrostatic analysis of the five actuators are summarized in Table 2. Table 2 lists the beam shape (square, semicircular, elliptical or rectangular), beam dimensions (length×width), type of anchor attachment (full hinge or partial double hinge), the initial tip deflection and the pull-down voltage for each of the actuator. For the actuators with two step snap-down, only the first pull-down voltage is presented.

TABLE 2

| Shape | Dimensions $\mu$m × $\mu$m | Anchor Type | Tip Deflection $\mu$m | Pull-down Voltage |
|---|---|---|---|---|
| Square | 857 × 645 | Partial | 200 | 70 |
| Semi Circle | 547 × 1085 | Full | 100 | 125 |
| Elliptical | 986 × 762 | Partial | 250 | 85 |
| Square | 653 × 645 | Full | 135 | 60 |
| Rectangle | 1100 × 471 | Partial | 175 | 70 |

The pull-down voltage of the electrostatic actuators was found to be a strong function of initial curvature, anchor attachment, and shape of the beam. The initial deflection and curvature of the beams was controlled by varying the built-in stress gradient in the gold layer. As calculated by the models, beams of these electrostatic actuators exhibited continuous movement with applied voltage before being pulled down to the bottom dielectric material.

The tip deflection of the beams was dependent on the shape of the beam. The beams were fabricated with curved or straight edges. Due to the built in-stress gradient in the beams, the beams with rectangular and square front shapes resulted in corner regions with greater deflection than the front edge of the beams. This resulted in higher curvature at the corners than the center of the beams. The two corners of the beams had approximately equal deflection. The extra curvature at the corners was due to the stress concentration at the corner regions of the beams. The beams with elliptical and semicircular shapes had smooth curvatures along their length without any corner effects. These beams showed uniform deflection where the tip of the beams always had the greatest deflection. The electrostatic actuators with the curved front shaped beams were found to be more reproducible in shape, which leads to a more reproducible capacitance, and better performance than the square-edged beams.

The electrostatic behavior of the actuators with a short (and wide) beam was compared to the actuators with a long (and narrow) beam (area was held constant). The pull-down behavior of the double-hinged square beam can be compared against the double-hinged long rectangular beam (Table 2). The dimensions of the double-hinged square beam are 857 $\mu$m×645 $\mu$m and the dimensions of double-hinged rectangular beam are 1100 $\mu$m×471 $\mu$m. Both these beams are partially anchored and have approximately the same initial tip deflection (200 $\mu$m vs. 175 $\mu$m). By changing the shape of the beams from square to rectangular, the pull-down voltage of the top electrode was reduced from 70 V to 40 V, which corresponds to a 43% reduction in pull-down voltage. Similarly, by comparing the behavior of full-hinge semicircular beam to a full-hinge square beam, it can be seen that they had comparable tip deflections (100 $\mu$m vs. 135 $\mu$m) and were fully anchored. A 52% reduction (from 125 V to 60 V) in the pull-down voltage was achieved by making the beam longer and narrower. The full-hinged semicircular beam had greater flexural rigidity than the full-hinge square beam. The flexural rigidity of the beam is given by $(E \times I)_{beam}$, where, E is the biaxial elastic modulus of the material and I is the moment of inertia. The moment of inertia of the beam is reduced as the beam is made long (and narrow) thereby reducing the rigidity of the structure.

The pull-down voltage of the electrostatic actuators was directly proportional to the initial tip deflection of the beam. The greater the distance between the beam (top electrode) and the bottom electrode, the greater the electrostatic force required to move the structure. This can be shown by comparing the pull-down behavior of the double-hinged elliptical beam and the double-hinged (long) rectangular beam (Table 2). The tip deflection of the long rectangular beam was 175 $\mu$m (0.1 $\mu$m of hard gold over 2.3 $\mu$m of soft gold). The elliptical beam had an initial tip deflection of 250 $\mu$m (0.2 $\mu$m of hard gold over 2.3 $\mu$m of soft gold). This resulted in an increase in the pull-down voltage from 40 V to 85 V, (an increase of 112%), for corresponding tip deflections of 175 $\mu$m and 250 $\mu$m (a 43% increase). Even though the length of the beam was shortened from 1100 $\mu$m to 968 $\mu$m (a 12% decrease), this effect was smaller than the tip deflection effect.

Partial anchoring of the beam reduced the flexural rigidity of the beam, which resulted in lower pull-down voltages. This can be shown by comparing the electrostatic behavior of the full-hinge square beam and the double-hinged square beam. Even though the tip deflection of the double-hinged square beam was more than the full-hinge square beam (200 $\mu$m vs. 135 $\mu$m), the pull-down voltage increased only by 10 V (from 60 V to 70 V). This was due to the partial anchoring of the double-hinged square beam. The partial (or double) hinge covered 40% of the width of the beam and reduced the rigidity of the structure.

The pull-down behavior of the curved electrostatic actuators was a strong function of the initial curvature of the beams. The second derivative of the total potential energy with respect to polynomial order, n is negative for $n \leq 2$ indicating unstable behavior. For a further discussion, see R. Legtenberg et al., "Electrostatic curved electrode actuators", Journal of Microelectromechanical Systems, vol. 6, No. 3, September 1997. The actuators with beams created by deposition of 0.1 $\mu$m of hard gold showed an initial curvature of polynomial order 2. These devices showed distinct regions of stable and unstable behavior. This indicates that the stress gradient model according to the invention is appropriate for beams with small intrinsic stress gradients (20 MPa/$\mu$m).

It was observed that as the length of the beam increased, the second order polynomial description of the beam curvature became less accurate and deviations from the stress gradient model become more severe. The beams with large intrinsic stress gradients fabricated with 0.2 and 0.3 $\mu$m of hard gold have shown an initial curvature of polynomial order greater than 2. The hard gold thickness variation along the length of the beam during electroplating resulted in non-uniform stress gradient along the length leading to the curved beam with higher order curvature. These devices have shown partial snap-down leading to an "uncurling" of the beams upon application of voltages greater than the critical pull-in voltage. Similar results with step-like unstable and stable regions were obtained by Legtenberg et al for electrostatic curved electrode actuators. It has been shown that for beams with curvature of order greater than 2, the second derivative of potential energy with respect to the polynomial order becomes positive, indicating stable behavior. The curved beams uncurled along the fixed electrode as the voltage was increased, leading to stable behavior (no pull-in) up to the maximum tip deflection. This behavior of the beams with higher order of initial curvature is attributed to the constrained beam deflection involving contact mechanics. The imperfections at the surface of the beam and bottom electrode also aid in the partial snap-down of the movable electrode. Surface asperities, entrapped particles or residues between the electrodes after the fabrication process could act like small bumpers, preventing complete snap-down of the beam.

While various embodiments of the application have been described, it will be apparent to those of ordinary skill in the art that many embodiments and implementations are possible that are within the scope of the present invention. Therefore, the invention is not to be restricted or limited except in accordance with the following claims and their equivalents.

All publications cited herein are hereby incorporated by reference in their entirety for all purposes.

What is claimed is:

1. An electrostatic actuated variable capacitor, comprising:
   a substrate;
   a bottom electrode on the substrate;
   an anchor on the substrate;
   an electrostatically actuated top electrode fixed at one end to the anchor, wherein the top electrode consists of a metal layer made substantially of a single metal with a stress gradient therein, and the top electrode is deflected relative to the bottom electrode upon electrostatic actuation, thereby changing the capacitance of the capacitor.

2. The actuator of claim 1, wherein the stress gradient in the metal layer causes the top electrode to curve away from the electrode.

3. The actuator of claim 1, wherein the stress gradient in the metal layer is between 10 to 60 MPa/$\mu$m.

4. The actuator of claim 1, wherein the bottom electrode is segmented.

5. The actuator of claim 1, wherein the one end of the top electrode is fully hinged to the anchor.

6. The actuator of claim 1, wherein the one end of the top electrode is double hinged to the anchor.

7. The actuator of claim 1, wherein a front edge of the top electrode opposite the fixed end of the top electrode is curved.

8. The actuator of claim 7, wherein the front edge of the top electrode is semicircular.

9. The actuator of claim 1, wherein the metal layer is made substantially of silver.

10. The actuator of claim 1, wherein the metal layer is made substantially of gold.

11. The actuator of claim 1, wherein the metal layer consists of deposited soft gold and deposited hard gold, the deposited soft gold and the deposited hard gold being made substantially of gold characterized by different crystal grain sizes and the deposited hard gold exhibiting a higher intrinsic stress than the deposited soft gold.

12. The actuator of claim 1, wherein the width of the deposited hard metal increases in the direction from the fixed end of the top electrode to a front end of the top electrode.

13. The actuator of claim 1, wherein the stress gradient of the metal layer is along the thickness of the metal layer.

14. The actuator of claim 1, wherein the stress gradient of the metal layer is along the length of the metal layer.

15. An electrostatic actuated variable capacitor, comprising:
   a substrate;
   a bottom electrode on the substrate;
   an anchor on the substrate;
   an electrostatically actuated top electrode fixed at one end to the anchor, wherein the top electrode comprises a metal layer made substantially of a single metal with a stress gradient therein, and the top electrode is deflected relative to the bottom electrode upon electrostatic actuation, thereby changing the capacitance of the capacitor, wherein the one end of the top electrode is fully hinged to the anchor.

16. An electrostatic actuated variable capacitor, comprising:
   a substrate;
   a bottom electrode on the substrate;
   an anchor on the substrate;
   an electrostatically actuated top electrode fixed at one end to the anchor, wherein the top electrode comprises a metal layer made substantially of a single metal with a stress gradient therein, and the top electrode is deflected relative to the bottom electrode upon electrostatic actuation, thereby changing the capacitance of the capacitor, wherein the one end of the top electrode is double hinged to the anchor.

* * * * *